US008897572B2

(12) United States Patent
Hamsici et al.

(10) Patent No.: US 8,897,572 B2
(45) Date of Patent: Nov. 25, 2014

(54) FAST SUBSPACE PROJECTION OF DESCRIPTOR PATCHES FOR IMAGE RECOGNITION

(75) Inventors: Onur C. Hamsici, San Diego, CA (US); Yuriy Reznik, San Diego, CA (US); John Hong, San Diego, CA (US); Sundeep Vaddadi, San Diego, CA (US); Chong U. Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 645 days.

(21) Appl. No.: 12/959,347

(22) Filed: Dec. 2, 2010

(65) Prior Publication Data

US 2011/0299782 A1    Dec. 8, 2011

Related U.S. Application Data

(60) Provisional application No. 61/265,950, filed on Dec. 2, 2009, provisional application No. 61/412,759, filed on Nov. 11, 2010.

(51) Int. Cl.
*G06K 9/46* (2006.01)

(52) U.S. Cl.
CPC .................................... *G06K 9/4671* (2013.01)
USPC ........................................................ 382/195

(58) Field of Classification Search
USPC ........................................................ 382/195
See application file for complete search history.

(56) References Cited

U.S. PATENT DOCUMENTS

| 6,678,874 | B1 * | 1/2004 | Jochym et al. ................ 716/112 |
| 7,054,468 | B2 | 5/2006 | Yang |
| 7,194,134 | B2 * | 3/2007 | Bradshaw ..................... 382/226 |
| 8,363,973 | B2 | 1/2013 | Liu et al. |
| 8,374,442 | B2 * | 2/2013 | Yu et al. ....................... 382/224 |
| 2007/0217676 | A1 | 9/2007 | Grauman et al. |
| 2009/0041340 | A1 | 2/2009 | Suzuki et al. |
| 2009/0238460 | A1 | 9/2009 | Funayama et al. |
| 2010/0303358 | A1 | 12/2010 | Acharyya |
| 2011/0026837 | A1 | 2/2011 | Kita |
| 2011/0194772 | A1 | 8/2011 | Sanjuan et al. |
| 2011/0218997 | A1 | 9/2011 | Boiman et al. |
| 2011/0222779 | A1 | 9/2011 | Karanam et al. |
| 2011/0255781 | A1 | 10/2011 | Hamsici et al. |
| 2011/0299770 | A1 | 12/2011 | Vaddadi et al. |
| 2012/0039539 | A1 | 2/2012 | Boiman et al. |
| 2013/0135301 | A1 | 5/2013 | Marimon et al. |

FOREIGN PATENT DOCUMENTS

JP        2010086540 A        4/2010

OTHER PUBLICATIONS (Julian, Mairal, Learning Multiscale Sparse representations for Image and Video Restoration, Apr. 16, 2008, Society for Industrial and Applied Mathematics).*
(David, Lowe, "Distinctive Image features from Scale-Invariant Keypoints", Jan. 2004, International Journal of Computer Vision 60 (2)-110-2004).*

(Continued)

*Primary Examiner* — Stephen R Koziol
*Assistant Examiner* — Totam Le
(74) *Attorney, Agent, or Firm* — Espartaco Diaz Hidalgo

(57) ABSTRACT

A method for generating a feature descriptor is provided. A set of pre-generated sparse projection vectors is obtained. A scale space for an image is also obtained, where the scale space having a plurality scale levels. A descriptor for a keypoint in the scale space is then generated based on a combination of the sparse projection vectors and sparsely sampled pixel information for a plurality of pixels across the plurality of scale levels.

61 Claims, 25 Drawing Sheets

Online Descriptor Generation Procedure
Using Sparse Coefficient Matrix

(56) References Cited

OTHER PUBLICATIONS

Chennubhotla C., et al., "Sparse PCA extracting multi-scale structure from data", Proceedings of the Eight IEEE International Conference on Computer Vision. (ICCV) Vancouver, British Columbia, Canada, Jul. 7-14, 2001; [International Conference on Computer Vision], Los Alamitos, CA : IEEE Comp. Soc, US, vol. 1, Jul. 7, 2001, pp. 641-647, XP010554042, DOI: DOI:10.1109/ICCV.2001.937579 ISBN: 978-0-7695-1143-6 sect.2.

David Marimon et al., "DARTs: Efficient scale-space extraction of DAISY keypoints", 2010 IEEE Conference on Computer Vision and Pattern Recognition (CVPR), Jun. 13-18, 2010, Piscataqay, NJ, USA, Jun. 13, 2010, pp. 2416-2423, XP031725765, ISBN: 978-1-4244-6984-0 sect 3 and 4 figure 1.

Duanduan Y., et al., "Performance evaluation of low-dimensional sifts", Image Processing (ICIP), 2010 17th IEEE International Conference on, IEEE, Piscataway, NJ, USA, Sep. 26, 2010, pp. 2729-2732, XP031815403, ISBN: 978-1-4244-7992-4 sect.2.3.

Ichimura N., "GPU computing with orientation maps for extracting local invariant features", Computer Vision and pattern recognition workshops (CVPRW), 2010 IEEE Computer society Conference on, IEEE, Piscataway, NJ, USA, Jun. 13, 2010, pp. 1-8, XP031744006, ISBN : 978-1-4244-7029-7 sect. 4 and 5 figure 5.

International Search Report—PCT/US2010/058807—ISA/EPO—May 24, 2011.

Lanckriet G., et al., "A Direct Formulation for Sparse PCA Using Semidefinite Programming", Advances in Neural Information Processing Systems SIAM Review, 2004, XP002636643, Retrieved from the Internet: URL:http://www.princeton.eduraspremon/sparsevd.pdf [retrieved on May 10, 2011].

Rodriguez F., et al., "Sparse representations for image classification:Learning discriminative and constructive non-parametric dictionaries", Univ.Minnesota, Minneapolis, MN,Tech. Rep./IMA Preprint, Dec. 2007, Oct. 2007, XP002636642, Retrieved from the Internet: URL:http://citeseerx.ist.psu.edu/viewdoc/download-"doi=10.1.1.154.7161&rep=rep1&type=pdf [retrieved on May 10, 2011] sect.2.1, 2.3,3.2 figure 3.

Szeliski R: "Computer Vision: Algorithms and Applications", Aug. 18, 2009, [Online] Aug. 18, 2009, pp. 1-979, XP002631475, Retrieved from the Internet: URL:http://www.szeliki.org/Book/drafts/SzeliskiBook_20100903_draft.pdf> p. 240.

Tipping M.E., "Sparse kernel principal component analysis", Advances in Neural Information Processing Systems 13. MIT Press. 2001, XP002636644, Retrieved from the Internet: URL:http//www.miketipping.com/index.php"page=papers [retrieved on May 11, 2011] sect.3.1 and 3.2.

Yamazaki M., et al., "Local Image Descriptors Using Supervised Kernel ICA", Jan. 13, 2009, Lecture Notes in Computer Science, Proceedings of the 3rd Pacific Rim Symposium on Advances in Image and Video Technology, Springer Berlin Heidelberg, Berlin, Heidelberg, vol. 5414, pp. 94-105, XP019137307, ISBN: 978-3-540-92956-7 sect.3 and sect1 par.1 and 2.

Krystian Mikolajczyk and Cordelia Schmid. "A Performance Evaluation of Local Descriptors," IEEE Transactions on Pattern Analysis and Machine Intelligence, vol. 27, No. 10, Oct. 2005, pp. 1615-1630.

Robert Tibshirani. "Regression Shrinkage and Selection via the Lasso," in Journal of the Royal Statistical Society. Series B (Methodological), vol. 58, No. 1 (1996), pp. 267-288.

Engin Tola, et al. "A Fast Local Descriptor for Dense Matching," IEEE Conference on Computer Vision and Pattern Recognition (CVPR '08). IEEE Conference on Jun. 23-28, 2008, pp. 1-8. Anchorage, AK, USA.

Simon A.J. Winder, et al. "Learning local image descriptors." Computer Vision and Pattern Recognition (CVPR '07). IEEE Conference on Jun. 17-22, 2007, pp. 1-8. Minneapolis, MN, USA.

Simon A.J. Winder, et al. "Picking the best daisy," Computer Vision and Pattern Recognition (CVPR '09). IEEE Conference on Jun. 20-25, 2009, pp. 178-185. Miami, FL, USA.

Ella Bingham, et al., "Abstract: Random projection in dimensionality reduction: Applications to image and text data," in Laboratory of Computer and Information Science, Helsinki University of Technology. Helsinki, Finland, 2001, pp. 1-6.

Piotr Dollar, et al., "Abstract: Behavior Recognition via Sparse Spatio-Temporal Features," in Department of Computer Science and Engineering, University of California, San Diego. La Jolla, California, USA, Oct. 2005, pp. 1-8.

Yang KE, et al., "PCA-SIFT: A More Distinctive Representation for Local Image Descriptors", Proceedings of the 2004 IEEE Computer Society Conference on Computer Vision and Pattern Recognition (CVPR'04), 2004, pp. II-506-II-513, vol. 2.

David G. Lowe. "Abstract: Distinctive Image Features from Scale-Invariant Keypoints," in Computer Science Department, University of British Columbia. Jan. 5, 2004. Vancouver, B.C., Canada.

Piotr Dollar, et al. "Abstract: Behavior Recognition via Sparse Spatio-Temporal Features," in Department of Computer Science and Engineering, University of California, San Diego. La Jolla, California, USA, 2005.

Ella Bingham, et al. "Abstract: Random projection in dimensionality reduction: Applications to image and text data," in Laboratory of Computer and Information Science, Helsinki University of Technology, Helsinki, Finland, 2001.

Alexander C. Berg and Jitendra Malik. "Geometric Blur for Template Matching," in IEEE Computer Society Conference on Computer Vision and Pattern Recognition (CVPR '01), vol. 1. Dec. 8-14, 2001. Kauai, Hawaii, USA.

Stephen Boyd and Lieven Vandenberghe. "Convex Optimization," Cambridge University Press, 2004. (http://books.google.com/books?hl=en&lr=&id=mYm0bLd3fcoC&oi=fnd&pg=PR11&dq=Boyd+Convex+Optimization.&ots=tbbTtFLEIZ&sig=MqhicbOO483Pc3hyULnSKoazNN8#v=onepage&q&f=false).

Vijay Chandrasekhar, et al. CHoG: Compressed Histogram of Gradients. A Low Bit-Rate Feature Descriptor. Computer Vision and Pattern Recognition in IEEE Conference on Computer Vision and Pattern Recognition (CVPR '09). Jun. 20-25, 2009. Miami, Florida, USA.

Bradley Efron, et al. "Lease Angle Regression," in The Annals of Statistics, vol. 32, No. 2, Apr. 2004, pp. 407-451. Institute of Mathematical Statistics.

Onur C. Hamsici and Aleix M. Martinez. "Spherical-Homoscedastic Distributions: The Equivalency of Spherical and Normal Distributions in Classification," in Journal of Machine Learning Research 8, 2007, pp. 1583-1623.

Gang Hua, et al. "Discriminant embedding for local image descriptors," in Computer Vision, 2007 (ICCV 2007). IEEE 11th International Conference on Oct. 14-21, 2007, pp. 1-8. Rio de Janeiro, Brazil.

Yang Ke and Rahul Sukthankar. "PCA-SIFT: A More Distinctive Representation for Local Image Descriptors," IEEE Computer Society Conference on Computer Vision and Pattern Recognition (CVPR '04)—vol. 2. Washington, D.C., USA, 2004.

David G. Lowe. "Distinctive image features from scale-invariant keypoints," in International Journal of Computer Vision, vol. 60, No. 2, pp. 91-110. 2004. The Netherlands.

Inoue Kouhei et al., "Speed-up of Kernel Based Nonlinear Subspace Method by Sparsification of Basis Vectors", Technical Report of the Institute of Electronics, Information and Communication Engineers, Japan, the Institute of Electronics, Information and Communication Engineers, Oct. 10, 2002, vol. 102, No. 381, pp. 7-12.

\* cited by examiner

*Exemplary Image Processing Stage – Scale Space Generation*

*Exemplary Typical PCA-SIFT Process*

*Exemplary Computation of Sparse Projection Vectors (Offline Estimation for PCA-SIFT Process)*

N= number of patches sampled
Patch size = n x n

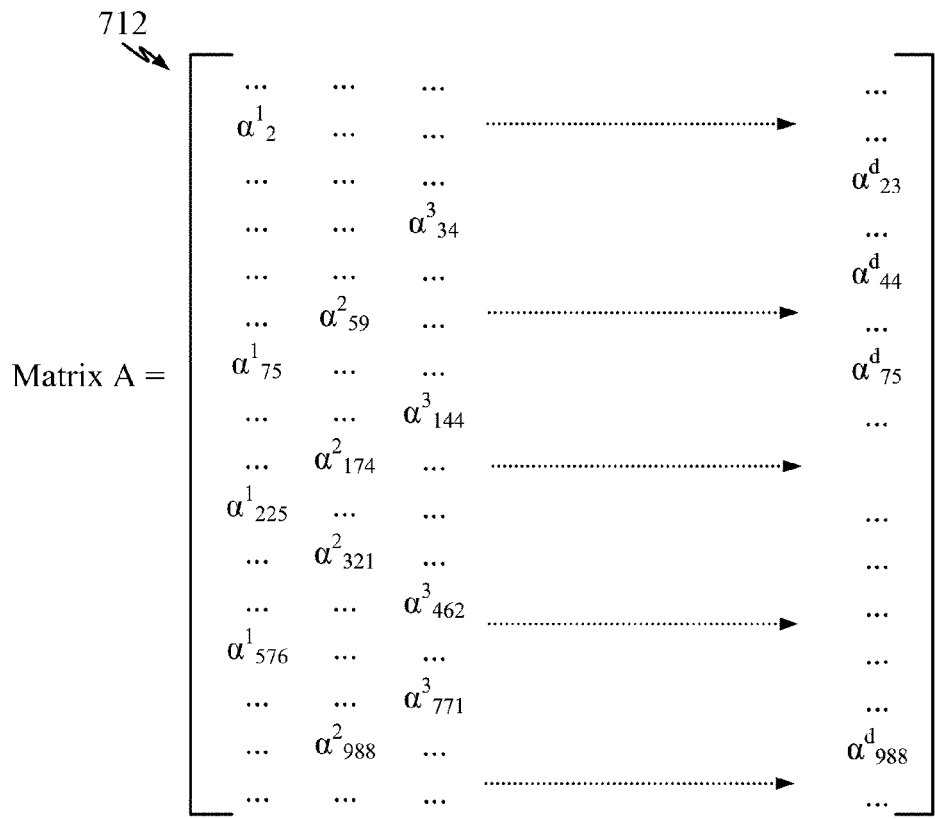
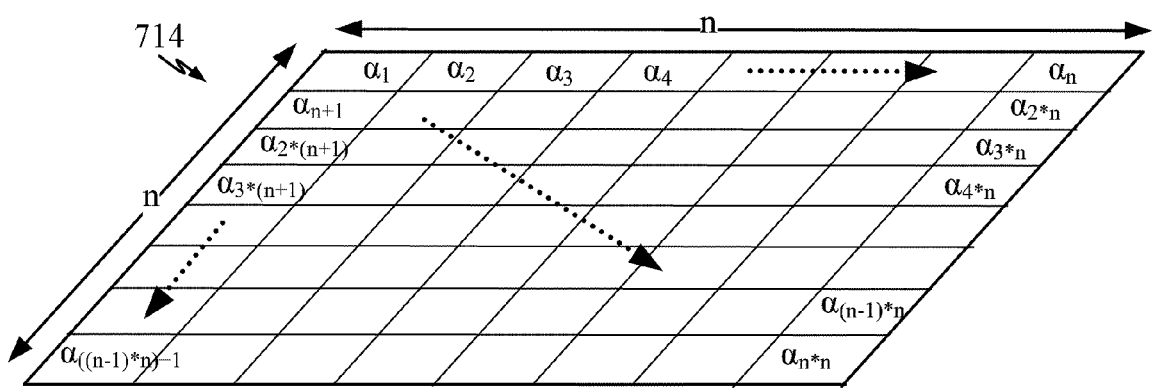
FIG. 7C

*Exemplary Method for Variance Maximization*

1008

Keypoint Descriptor
Component Calculation:

$Dcomp^1 = \alpha^1_2 * g_{1,2} + \alpha^1_{75} * g_{2,36} + \alpha^1_{201} * g_{6,6} + \alpha^1_{576} * g_{15,30}$ $Dcomp^2 = \alpha^2_{59} * g_{2,20} + \alpha^2_{174} * g_{5,18} + \alpha^2_{321} * g_{9,9} + \alpha^2_{988} * g_{26,13}$ $Dcomp^3 = \alpha^3_{34} * g^3_{1,34} + \alpha^3_{144} * g^3_{4,27} + \alpha_{462} * g^3_{12,33} + \alpha^3_{771} * g^3_{20,30}$

⋮

$Dcomp^d = \alpha^d_{23} * g_{1,23} + \alpha^d_{44} * g_{2,5} + \alpha^d_{75} * g_{2,36} + \alpha^d_{988} * g_{26,13}$

1010

Descriptor Vector = $[Dcomp^1, Dcomp^2, Dcomp^3, ..., Dcomp^d]$

1012

Descriptors

| PATCH IDENTIFIER | Descriptor Elements |
|---|---|
| 1 | $[Dcomp^1_1, Dcomp^2_1, Dcomp^3_1, ..., Dcomp^d_1]$ |
| 2 | $[Dcomp^1_2, Dcomp^2_2, Dcomp^3_2, ..., Dcomp^d_2]$ |
| 3 | $[Dcomp^1_3, Dcomp^2_3, Dcomp^3_3, ..., Dcomp^d_3]$ |
| ... | |
| m | $[Dcomp^1_m, Dcomp^2_m, Dcomp^3_m, ..., Dcomp^d_m]$ |

$$\text{where } Dcomp^i_T = \sum_{k=1}^{s} \alpha^i_{IX_i(k)} * I_{IX_i(k)}$$

for T = 1 ...m

FIG. 10B

Offline Training Coefficients

1102

| PATCH IDENTIFIER | Coefficients Per Keypoint |
|---|---|
| 1 | $\alpha^{1,1} \ldots \alpha^{1,d}$ |
| 2 | ... |
| 3 | ... |
| ... | |
| m | $\alpha^{m,1} \ldots \alpha^{m,d}$ | where each $\alpha^{i,k} = \begin{bmatrix} \alpha^{1,k}_{IX_{k,i}(1)} \\ \downarrow \\ \alpha^{i,k}_{IX_{k,i}(s)} \end{bmatrix}$

Offline Training Locations

1104

| PATCH IDENTIFIER | LOCATIONS WITHIN PATCH |
|---|---|
| 1 | $IX_{1,1}, \ldots, IX_{1,d}$ |
| 2 | .... |
| 3 | .... |
| ... | .... |
| m | $IX_{m,1}, \ldots, IX_{m,d}$ | where each $IX_{i,k} = \begin{bmatrix} x^1_{i,k}, y^1_{i,k} \\ \downarrow \\ x^s_{i,k}, y^s_{i,k} \end{bmatrix}$

FIG. 11

*Descriptor Generation Method Using Predefined Sparse Projection Vectors*

*Method for Online Descriptor Generation Using Sparse Projection Vector*

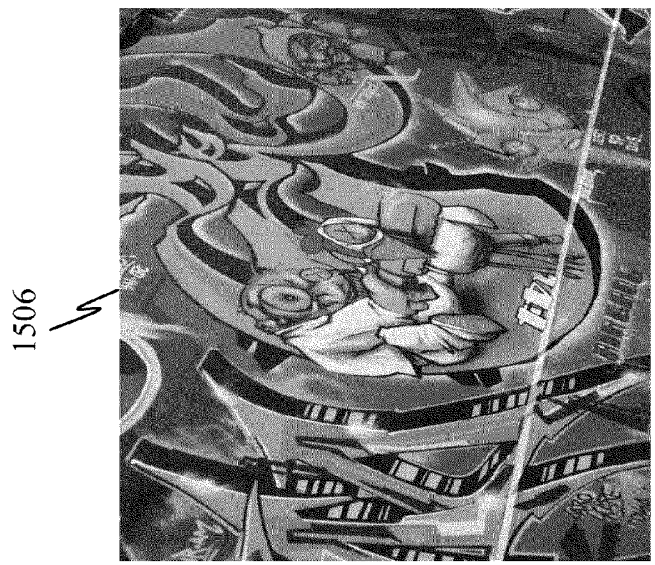
Image 3
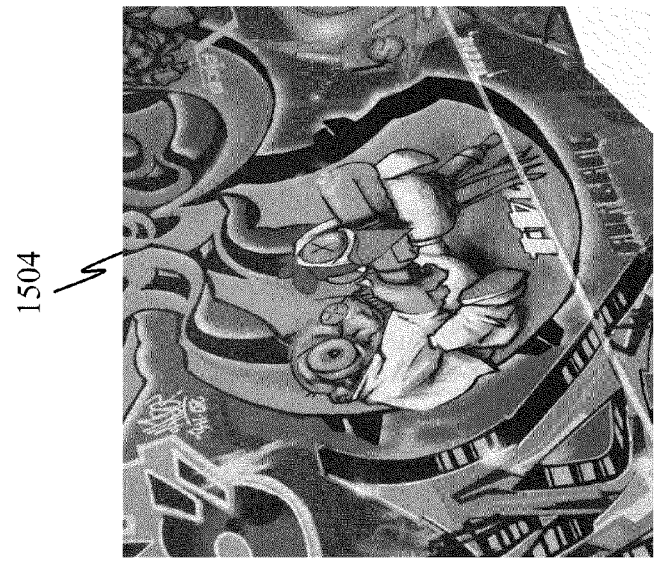
Image 2
FIG. 15
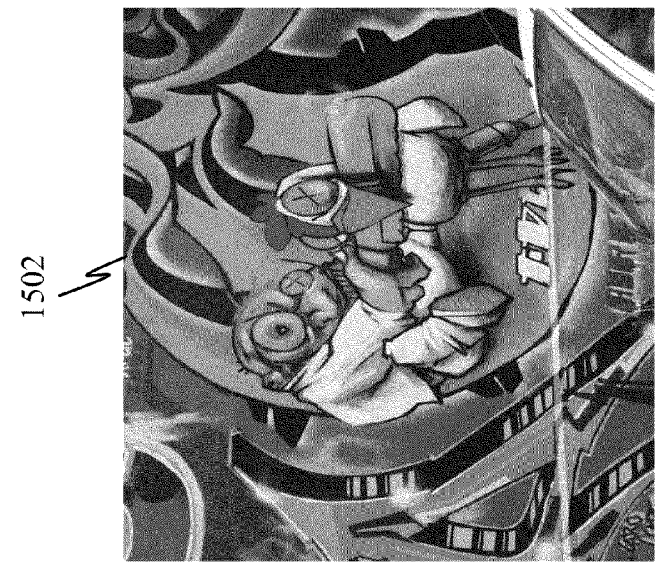
Image 1

| | SIFT | PCA-SIFT | Sparse PCA-SIFT |
|---|---|---|---|
| Number of Operations (Multiplications & Additions per Descriptor) | $(g \times g) \times 2 \times 2^2 \times (3\alpha \times 3\alpha)$ $= 32 \times (6\alpha)^2 = 1152\alpha^2$ $(g \times g)$ – grid cell size $\alpha$ – scale | $2 \times W^2 \times d$ $W^2$ – patch dimension $d$ – # dimensional subspace | $d \times s$ $s$ – avg. sparse coefficients/subspace $d$ – # dimensional subspaces |

$32(6\sigma)^2 = 4 \times 4 \times 2 \times (2 \times 3\sigma)^2$
→ $3\sigma \times 3\sigma$ pixels/grid cell
→ Interpolation over Space
→ Interpolation over Scale
→ 4 by 4 grid cell For $\sigma = 1.6$ → $1152 \ \sigma^2 = 2949$ operations
For $\sigma = 3.2$ → $1152 \ \sigma^2 = 11796$ operations For $W^2 = (39 \text{ pixel})^2$ and
$d = 50$ dimensional subspaces
$2 \times W^2 \times d = 2 \times (39)^2 \times 50 = 152100$ operations $d = 200$ dimensional subspaces
For $s = 4$ → $800$ operations
For $s = 9.41$ → $1882$ operations

FIG. 17

FAST SUBSPACE PROJECTION OF DESCRIPTOR PATCHES FOR IMAGE RECOGNITION

CLAIM OF PRIORITY UNDER 35 U.S.C. §119

The present Application for Patent claims priority to U.S. Provisional Applications No. 61/265,950 entitled "Fast Subspace Projection of Descriptor Patches for Image Recognition", filed Dec. 2, 2009, and No. 61/412,759 entitled "Fast Descriptor Extraction in Scale-Space", filed Nov. 11, 2010, both assigned to the assignee hereof and hereby expressly incorporated by reference herein.

BACKGROUND

1. Field

One feature relates to computer vision, and more particularly, to methods and techniques for improving recognition and retrieval performance, processing, and/or compression of images.

2. Background

Various applications may benefit from having a machine or processor that is capable of identifying objects in a visual representation (e.g., an image or picture). The field of computer vision attempts to provide techniques and/or algorithms that permit identifying objects or features in an image, where an object or feature may be characterized by descriptors identifying one or more keypoints. These techniques and/or algorithms are often also applied to face recognition, object detection, image matching, 3-dimensional structure construction, stereo correspondence, and/or motion tracking, among other applications. Generally, object or feature recognition may involve identifying points of interest (also called keypoints) in an image for the purpose of feature identification, image retrieval, and/or object recognition. Preferably, the keypoints may be selected and/or processed such that they are invariant to image scale changes and/or rotation and provide robust matching across a substantial range of distortions, changes in point of view, and/or noise and changes in illumination. Further, in order to be well suited for tasks such as image retrieval and object recognition, the feature descriptors may preferably be distinctive in the sense that a single feature can be correctly matched with high probability against a large database of features from a plurality of target images.

After the keypoints in an image are detected and located, they may be identified or described by using various descriptors. For example, descriptors may represent the visual features of the content in images, such as shape, color, texture, rotation, and/or motion, among other image characteristics. A descriptor may represent a keypoint and the local neighborhood around the keypoint. The goal of descriptor extraction is to obtain robust, noise free representation of the local information around keypoints. This may be done by projecting the descriptor to a noise free Principal Component Analysis (PCA) subspace. PCA involves an orthogonal linear transformation that transforms data (e.g., keypoints in an image) to a new coordinate system such that the greatest variance by any projection of the data comes to lie on the first coordinate (called the first principal component), the second greatest variance on the second coordinate (second principal component), and so on. However, such projection to PCA subspace requires computationally complex inner products with high-dimensional projection vectors.

The individual features corresponding to the keypoints and represented by the descriptors are matched to a database of features from known objects. Therefore, a correspondence searching system can be separated into three modules: keypoint detector, feature descriptor, and correspondence locator. In these three logical modules, the descriptor's construction complexity and dimensionality have direct and significant impact on the performance of the feature matching system. A variety of descriptors have been proposed with each having different advantages. Scale invariant feature transform (SIFT) opens a $12\sigma \times 12\sigma$ patches aligned with the dominant orientation in the neighborhood and sized proportional to the scale level of the detected keypoint $\sigma$. The gradient values in this region are summarized in a 4×4 cell with 8 bin orientation histograms in each cell. PCA-SIFT showed that gradient values in the neighborhood can be represented in a very small subspace.

Most of the descriptor extraction procedures agree on the advantages of the dimensionality reduction to eliminate the noise and improve the recognition accuracy. However, large computational complexity associated with projecting the descriptors to a low dimensional subspace prevents its practical usage. For instance, PCA-SIFT patch size is 39×39, which results in a $2*39^2$ dimensional projection vectors considering the gradient values in x and y direction. Hence, each descriptor in the query image requires $2*39^2*d$ multiplications and additions for a projection to a d-dimensional subspace. While this may not generate significant inefficiency for powerful server-side machines, it may be a bottleneck in implementations with limited processing resources, such as mobile phones.

Such feature descriptors are increasingly finding applications in real-time object recognition, 3D reconstruction, panorama stitching, robotic mapping, video tracking, and similar tasks. Depending on the application, transmission and/or storage of feature descriptors (or equivalent) can limit the speed of computation of object detection and/or the size of image databases. In the context of mobile devices (e.g., camera phones, mobile phones, etc.) or distributed camera networks, significant communication and processing resources may be spent in descriptors extraction between nodes. The computationally intensive process of descriptor extraction tends to hinder or complicate its application on resource-limited devices, such as mobile phones.

Therefore, there is a need for a way to quickly and efficiently generate local feature descriptors.

SUMMARY

The following presents a simplified summary of one or more embodiments in order to provide a basic understanding of some embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

A method and device are provided for generating a feature descriptor. A set of pre-generated sparse projection vectors is obtained. The sparse projection vectors may be generated independent of the image. Each sparse projection vector may be constrained to scales of a smoothening kernel for the image. Each of the sparse projection vectors may serve to maximize or minimize an objective function. The objective function may be a maximization of an autocorrelation matrix for pixel information across a plurality of scale levels for a training set of images. A sparse projection vector may include a majority of zero elements and a plurality of non-zero elements. The non-zero elements are obtained by a variance maximization procedure.

A scale space for an image is also obtained, where the scale space having a plurality scale levels. A descriptor for a keypoint in the scale space is then generated based on a combination of the sparse projection vectors and sparsely sampled pixel information for a plurality of pixels across the plurality of scale levels. The pixel information may include gradient information for each pixel within a patch associated the keypoint. The plurality of pixels may be associated with a patch for the keypoint. The plurality of pixels may be selected at pre-determined locations corresponding to non-zero coefficients for the sparse projection vectors. The patch may have a dimension of m pixels by n pixels, and the keypoint descriptor is generated with fewer operations than the m*n dimension of the patch.

To obtain the pixels, a keypoint may be obtained from the scale space for the image and a patch is then obtained for the keypoint, where the patch includes the plurality of pixels.

The plurality of sparse projection vectors may define a set of non-zero scaling coefficients, each non-zero scaling coefficient being associated with a corresponding pixel location within the patch.

The descriptor may be generated by combining a plurality of descriptor components, each descriptor component generated by: (a) identifying pixel locations based on the non-zero scaling coefficient locations for a first sparse projection vector; and/or (b) multiplying a value of the pixel location from the patch with the corresponding non-zero scaling coefficient for the first sparse projection vector and add the resulting values together to obtain a first descriptor component. Additional descriptor components may be obtained for the remaining plurality of sparse projection vectors to obtain a additional descriptor components, wherein the first descriptor component and additional descriptor components are combined as a vector to obtain the keypoint descriptor.

BRIEF DESCRIPTION OF THE DRAWINGS

Various features, nature, and advantages may become apparent from the detailed description set forth below when taken in conjunction with the drawings in which like reference characters identify correspondingly throughout.

FIG. 11 illustrates an exemplary representation of a sparse projection matrix as non-zero coefficients and their corresponding patch locations.

FIG. 15 illustrates various views for the same test image, from which the accuracy of a descriptor generated using a spare PCA-SIFT algorithm may be tested.

FIG. 17 is a table illustrating the comparative computational complexity of SIFT, PCA-SIFT and Sparse PCA-SIFT algorithms.

DETAILED DESCRIPTION

Figure 1A:
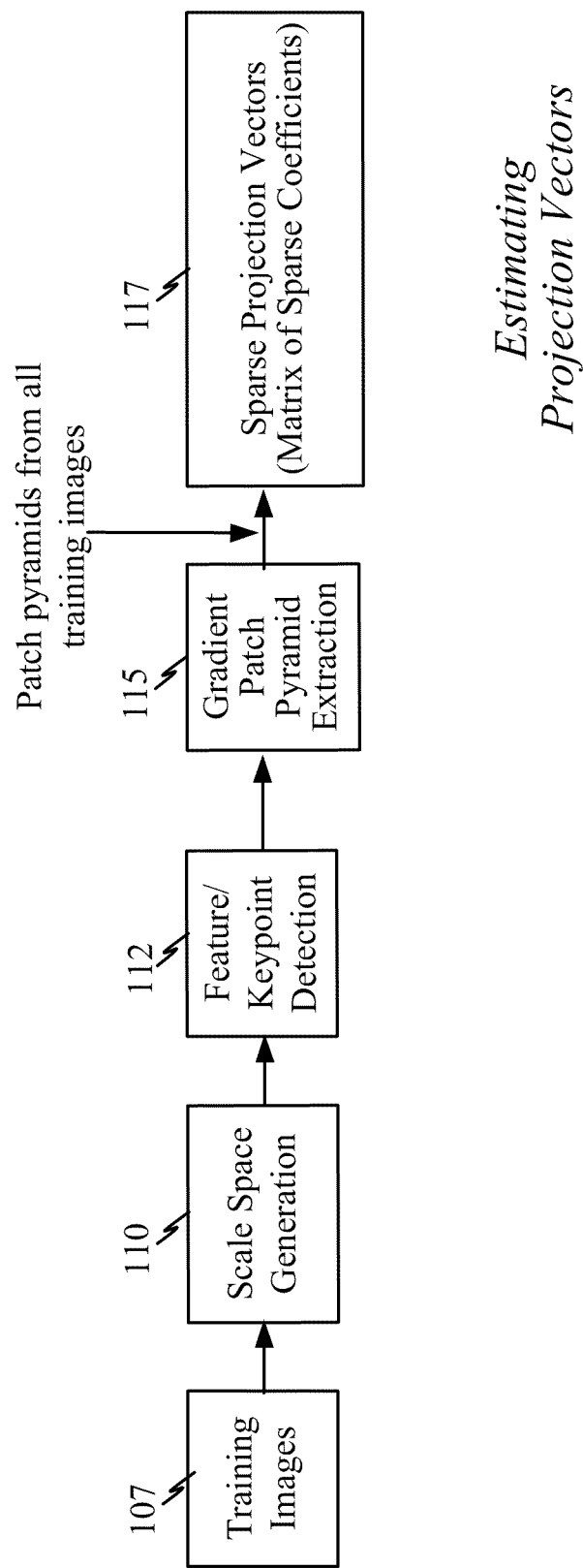
FIG. 1 (comprising FIGS. 1A, 1B, and 1C) are block diagrams illustrating the various stages for generating and using fast subspace sparse projection vectors in object recognition.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Exemplary Object Recognition Process

Figure 1B:
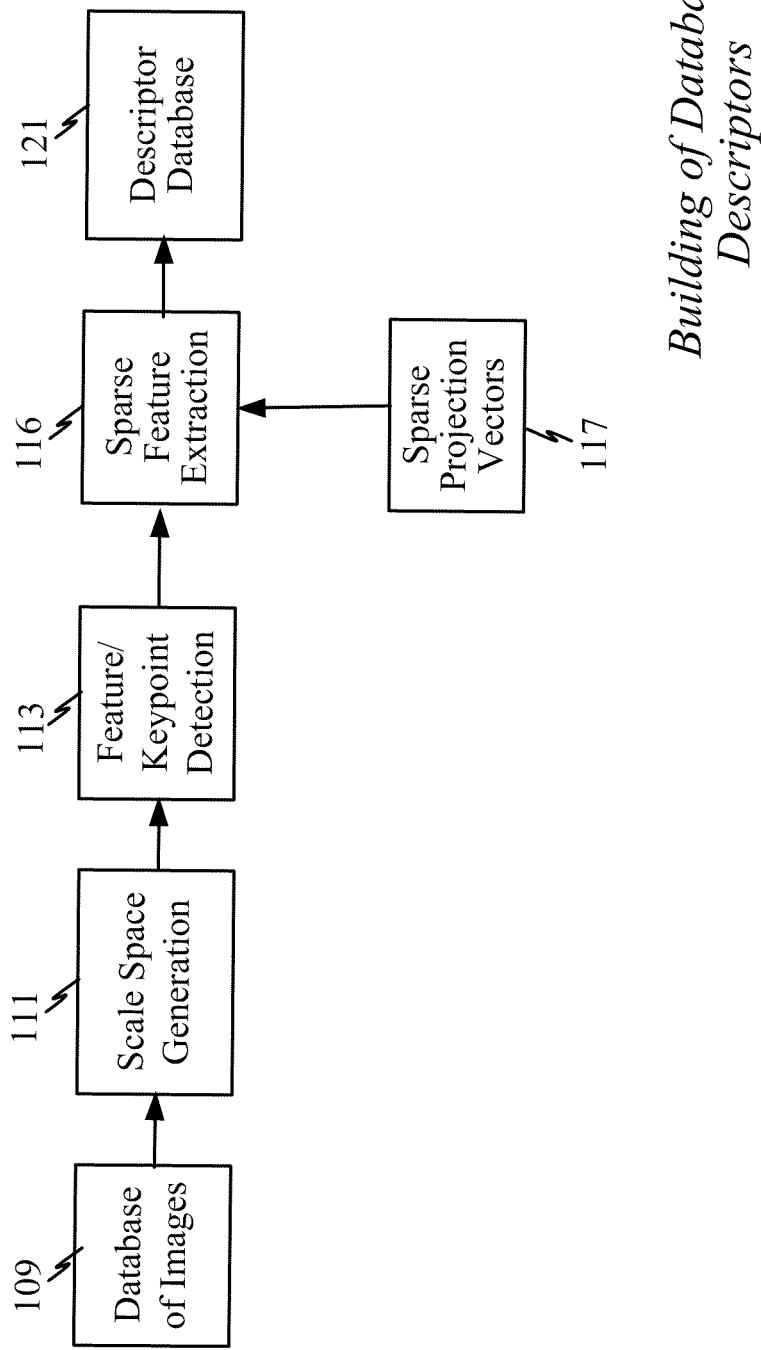
Figure 1C:
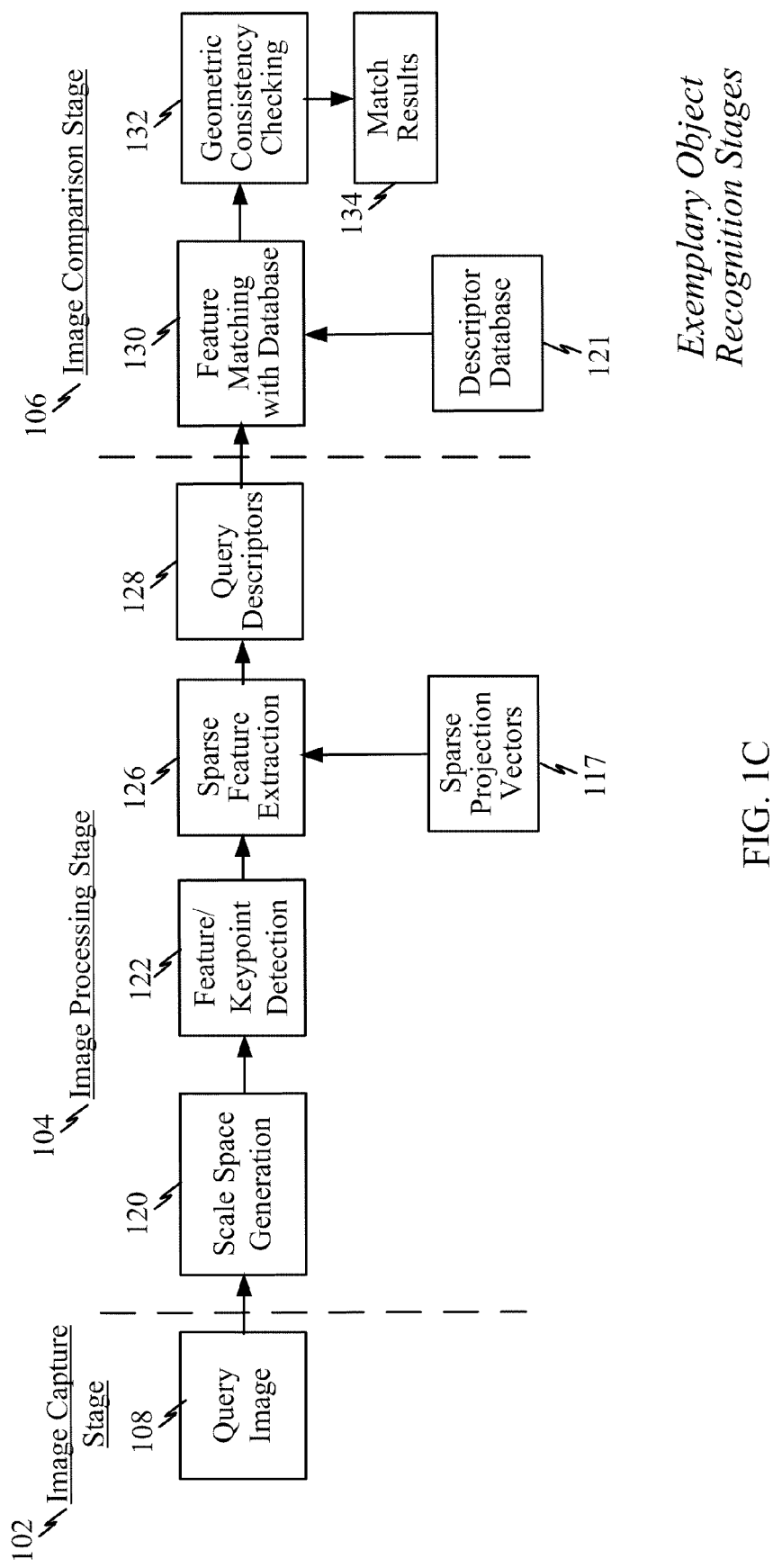

FIG. 1 (comprising FIGS. 1A, 1B, and 1C) are block diagrams illustrating the various stages for generating and using fast subspace sparse projection vectors in object recognition.

FIG. 1A is block diagram illustrating the estimation of sparse projection vectors. A plurality of training images 107 may be obtained. For each image, scale space generation 110 is performed to obtain a scale space pyramid (e.g., Gaussian scale space pyramid). Feature/keypoint detection 112 may then be performed on the generated scale space. Gradient patch pyramid extraction 115 is then performed whereby, for each detected keypoint, a patch of gradients is extracted (e.g., around the keypoint) from the scale space. Such a patch is typically re-oriented with respect to the orientation (in plane rotation) of the dominant gradient in the patch, a commonly known method of achieving rotation invariance. This process may be repeated for all training images. Using the generated gradient patches for a plurality of keypoints in the training images, a plurality of sparse projection vectors 117 is computed. Each of the sparse projection vectors 117 may comprise a plurality of scaling coefficients having corresponding patch locations. In one representation, the sparse projection vectors 117 may be organized as a sparse coefficient matrix, with each column of the sparse coefficient matrix defining a sparse projection vector.

FIG. 1B is a block diagram illustrating how a library of descriptors for a database of images may be built based on the sparse projection vectors. Here, a database of images 109 is obtained, scale spaces 111 are generated for each database image, and features/keypoints are detected 113 from these scale spaces. Sparse feature extraction 116 is then performed using the sparse projection vectors 117 to generate a database of keypoint descriptors 121.

FIG. 1C is a block diagram illustrating the functional stages for performing object recognition on a queried image by using sparse projection vectors. At an image capture stage 102, a query image 108 may be captured or otherwise obtained. For examples, the query image 108 may be captured by an image capturing device, which may include one or more image sensors and/or an analog-to-digital converter, to obtain a digital captured image. The image sensors (e.g., charge coupled devices (CCD), complementary metal semiconductors (CMOS)) may convert light into electrons. The electrons may form an analog signal that is then converted into digital values by the analog-to-digital converter. In this manner, the image 108 may be captured in a digital format that may define the image I(x, y), for example, as a plurality of pixels with corresponding color, illumination, and/or other characteristics.

In an image processing stage 104, the captured image 108 is then processed by generating a corresponding scale space 120 (e.g., Gaussian scale space), performing feature/keypoint detection 122, and performing sparse feature extraction 126 based on the sparse projection vectors 117 to obtain query descriptors 128. At an image comparison stage 106, the query descriptors 128 are used to perform feature matching 130 with the database of known descriptors 121. Geometric verification or consistency checking 132 may then be performed on keypoint matches (e.g., based on matching descriptors) to ascertain correct feature matches and provide match results 134. In this manner, a query image may be compared to, and/or identified from, a database of target images 109.

Figure 2:
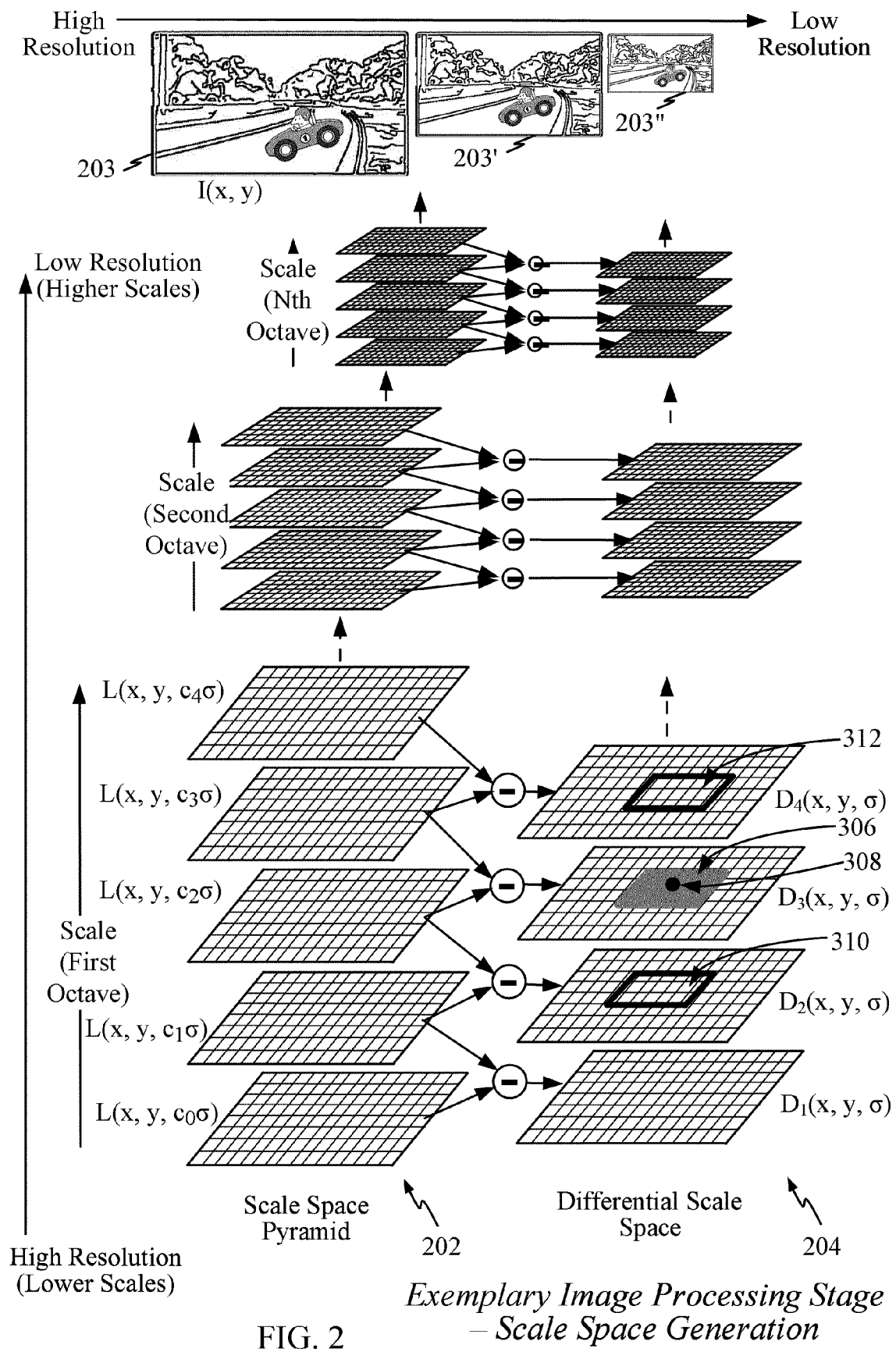
FIG. 2 illustrates Gaussian scale space generation in an exemplary image processing stage.

FIG. 2 illustrates Gaussian scale space generation in an exemplary image processing stage 104. A number of algorithms, such as Scale Invariant Feature Transform (SIFT), have been developed to perform feature detection in images. A first step towards detection of particular objects in an image is classifying the queried object based on its local features. The goal is to identify and select features that are invariant and/or robust to, for example, illumination, image noise, rotation, scaling, and/or small changes in viewpoint. That is, matches between a query image and a comparison target image should be found despite differences in illumination, image noise, rotation, scale, and/or viewpoint between the two images. One way to do this is to perform extrema detection (e.g., local maxima or minima) on patches of an image to identify highly distinctive features (e.g., distinctive points, pixels, and/or regions in the image).

SIFT is one approach for detecting and extracting local features that are reasonably invariant to changes in illumination, image noise, rotation, scaling, and/or small changes in viewpoint. The image processing stage 104 for SIFT may include: (a) scale-space extrema detection, (b) keypoint localization, (c) orientation assignment, and/or (d) generation of keypoint descriptors. SIFT builds the descriptors as a histogram of the gradients in the neighborhood of a keypoint. It should be clear that alternative algorithms for feature detection and, subsequent feature descriptor generation, including Speed Up Robust Features (SURF), Gradient Location and Orientation Histogram (GLOH), Local Energy based Shape Histogram (LESH), Compressed Histogram of Gradients (CHoG), among others, may also benefit from the features described herein.

To generate a scale space pyramid 202, a digital image I(x, y) 203 (FIG. 2) is gradually smoothened/blurred to construct the scale space pyramid 202. Blurring (smoothing) generally involves convolving the original image I(x, y) with a blurring/smoothing function G(x, y, c) at scale c such that the scale space L(x, y, c) is defined as L(x, y, c)=G(x, y, c)*I(x, y). In one example, the scale space pyramid may be a Gaussian scale space pyramid. Thus, the smoothing/blurring function G may be a Gaussian kernel, c may denote the standard deviation of the Gaussian function G that is used for blurring the image I(x, y). As multiplier c, is varied ($c_0 < c_1 < c_2 < c_3 < c_4$), the standard deviation c varies and a gradual blurring/smoothing of the image I(x, y) is obtained. Here, is the base scale variable (e.g., the width of the Gaussian kernel). When the initial image I(x, y) is incrementally convolved with the Gaussian function G to produce the blurred image scale spaces L, the blurred image scale spaces L are separated by the constant factor c in the scale space. As the number of Gaussian blurred (smoothened) image scale spaces L increase and the approximation provided for the Gaussian pyramid 202 approaches a continuous space, the two scales also approach one scale. In one example, the convolved image scale spaces L may be grouped by octave, where an octave may correspond to a doubling of the value of the standard deviation. Moreover, the values of the multipliers c (e.g., $c_0 < c_1 < c_2 < c_3 < c_4$), are selected such that a fixed number of image scale spaces L are obtained per octave. Each octave of scaling may correspond to an explicit image resizing. Thus, as the original image I(x,y) is blurred/smoothened by the gradually blurring/smoothening function G, the number of pixels is progressively reduced.

A differential scale space 204 (e.g., difference of Gaussian (DoG) pyramid) may be constructed by computing the difference of any two consecutive blurred image scale spaces in the pyramid 202. In the differential scale space 204, D(x, y, a)=L(x, y, $c_n$)−L(x, y, $c_{n-1}$). A differential image scale space D(x, y,) is the difference between two adjacent smoothened/blurred images L at scales $c_n$, and $c_{n-1}$. The scale of the differential scale space D(x, y,) lies somewhere between $c_n$, and $c_{n-1}$. The images for the levels of the differential scale space 204 may be obtained from adjacent blurred images per octave of the scale space 202. After each octave, the image may be down-sampled by a factor of two (2) and then the process is repeated. In this manner an image may be transformed into local features that are robust or invariant to translation, rotation, scale, and/or other image parameters and/or distortions.

Once generated, the differential scale space 204 for a queried image may be utilized for extrema detection to identify features of interest (e.g., identify highly distinctive points in the image). These highly distinctive points are herein referred to as keypoints. These keypoints may be identified by the characteristics of a patch or local region surrounding each keypoint. A descriptor may be generated for each keypoint and its corresponding patch, which can be used for comparison of keypoints between a query image and stored target images. A "feature" may refer to a descriptor (i.e., a keypoint and its corresponding patch). A group of features (i.e., keypoints and corresponding patches) may be referred to as a cluster.

Figure 3:
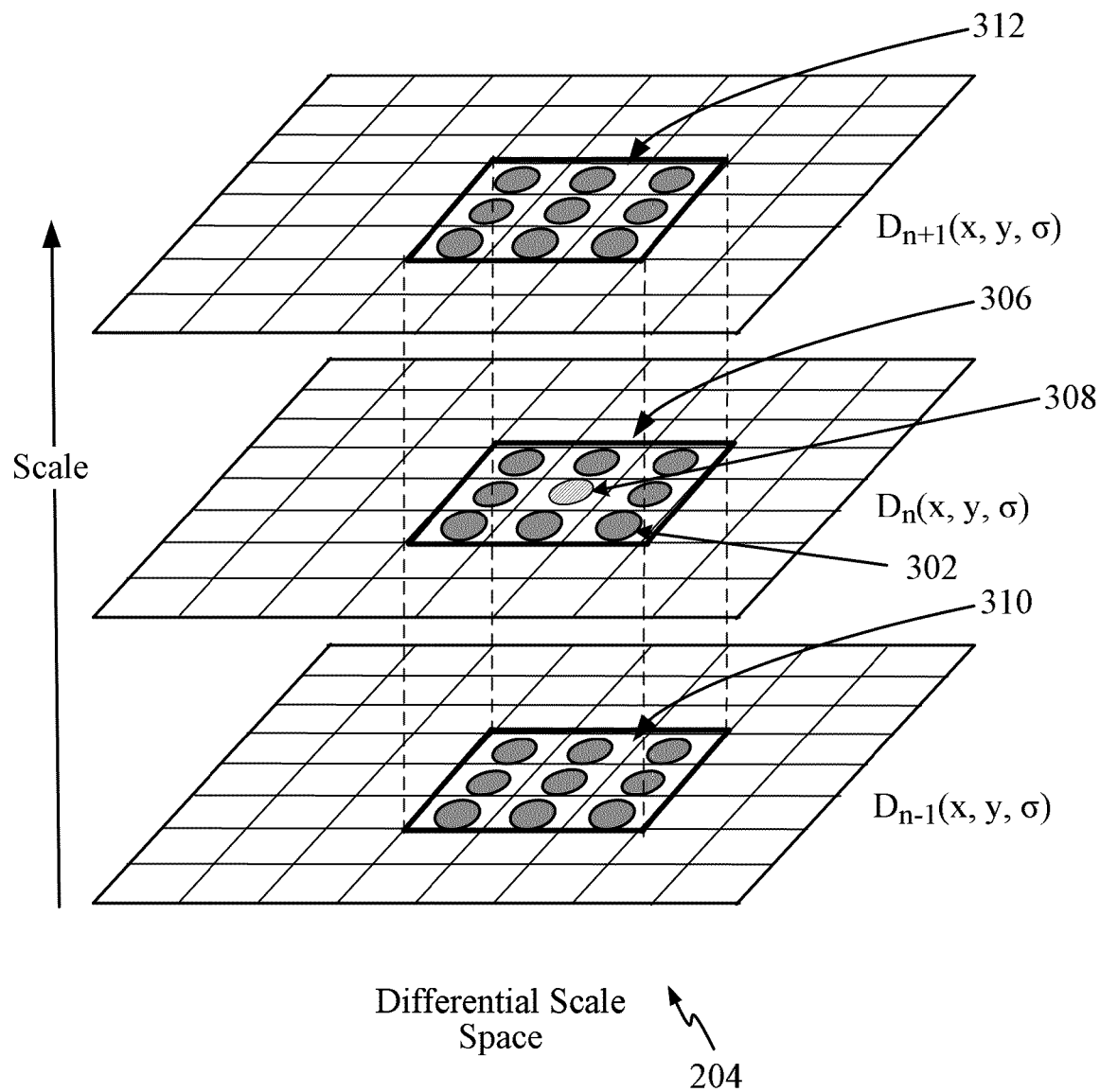
FIG. 3 illustrates feature detection in the exemplary image processing stage.

FIG. 3 illustrates feature detection in the exemplary image processing stage 104. In a feature detection, the differential scale space 204 (e.g., Difference of Gaussian scale space) may be used to identify keypoints for the query image I(x, y).

Feature detection seeks to determine whether a local region or patch around a particular sample point or pixel in the image is a potentially interesting patch (geometrically speaking) and thus should be considered as a candidate for matching with the stored features.

Generally, local maxima and/or local minima in the differential scale space 204 are identified and the locations of these maxima and minima are used as keypoint locations in the differential scale space 204. In the example illustrated in FIG. 3, a keypoint 308 has been identified with a patch 306. Finding the local maxima and minima (also known as local extrema detection) may be achieved by comparing each pixel (e.g., the pixel for keypoint 308) in the differential scale space 204 to its eight neighboring pixels at the same scale and to the nine neighboring pixels (in adjacent patches 310 and 312) in each of the neighboring scales on the two sides of the keypoint 408, for a total of 26 pixels (9×2+8=26). Here, the patches are defined as 3×3 pixel regions. If the pixel value for the keypoint 306 is a maximum or a minimum among all twenty-six (26) compared pixels in the patches 306, 310, and 312, then it is selected as a keypoint. The keypoints may be further processed such that their location is identified more accurately and some of the keypoints, such as the low contrast keypoints and edge keypoints may be discarded.

Figure 4:
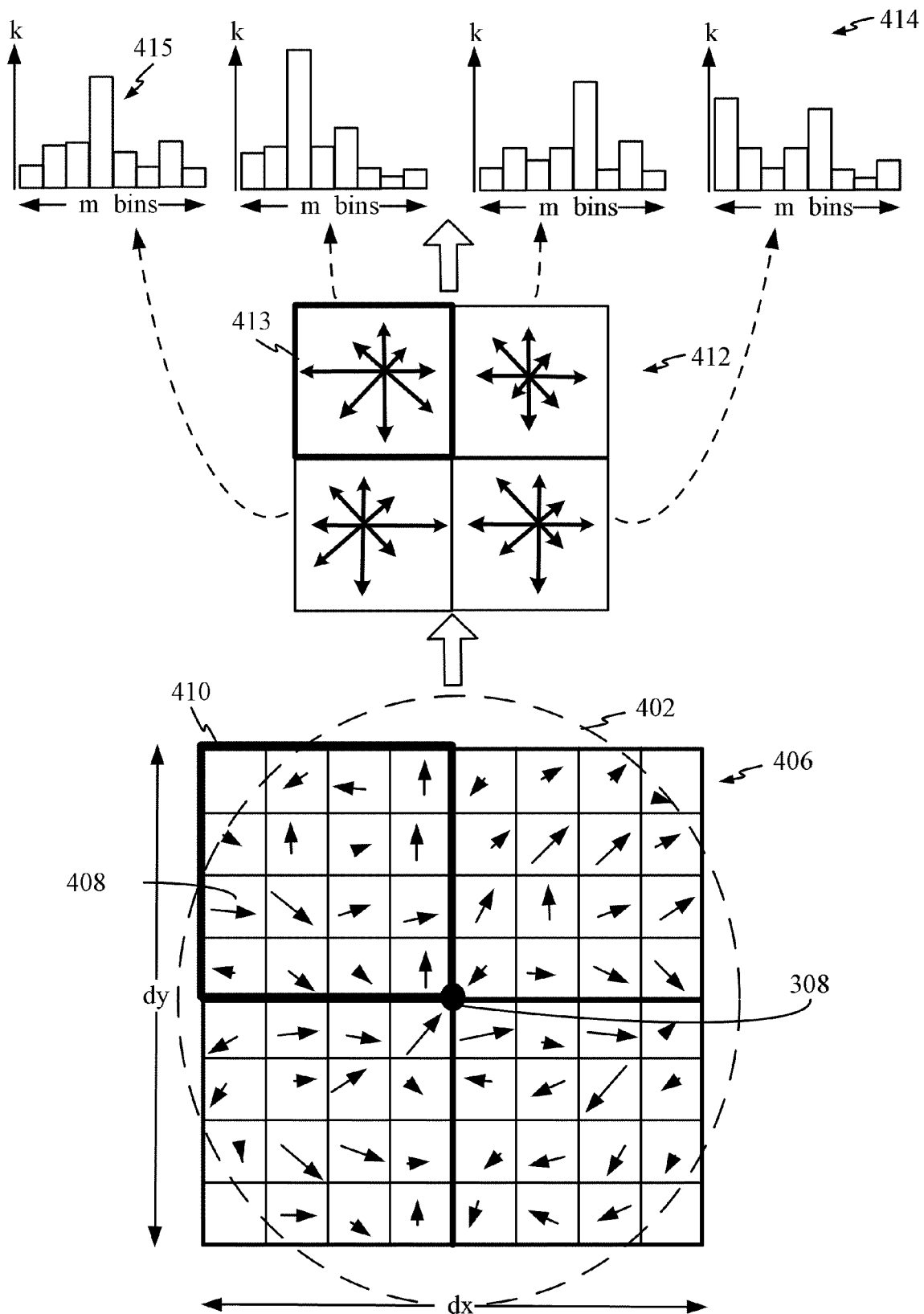
FIG. 4 illustrates feature descriptor extraction in the exemplary image processing stage.

FIG. 4 illustrates feature descriptor extraction in the exemplary image processing stage 104. Generally, a feature (e.g., a keypoint and its corresponding patch) may be represented by a descriptor, which allows for efficient comparison of the feature (from a query image) to features stored in a database of target images. In one example of feature descriptor extraction, each keypoint may be assigned one or more orientations, or directions, based on the directions of the local image gradient. By assigning a consistent orientation to each keypoint based on local image properties, the keypoint descriptor can be represented relative to this orientation and therefore achieve invariance to image rotation. Magnitude and direction calculations may be performed for every pixel in the neighboring region around the keypoint 308 in the blurred image scale space L and/or at the differential scale space. The magnitude of the gradient for the keypoint 308 located at (x, y) may be represented as m(x, y) and the orientation or direction of the gradient for the keypoint at location (x, y) may be represented as Γ(x, y). The scale of the keypoint is used to select the smoothed image, L, with the closest scale to the scale of the keypoint 308, so that all computations are performed in a scale-invariant manner. For each image sample, L(x, y), at this scale, the gradient magnitude, m(x, y), and orientation, Γ(x, y), are computed using pixel differences. For example the magnitude m(x,y) may be computed as:

$$m(x, y) = \sqrt{(L(x+1, y) - L(x-1, y))^2 + (L(x, y+1) - L(x, y-1))^2}.$$ (Equation 1)

The direction or orientation Γ(x, y) may be calculated as:

$$\Gamma(x, y) = \arctan\left[\frac{L(x, y+1) - L(x, y-1)}{L(x+1, y) - L(x-1, y)}\right].$$ (Equation 2)

Here, L(x, y) is a sample of the Gaussian-blurred image L(x, y), at scale which is also the scale of the keypoint.

The gradients for the keypoint 308 may be calculated consistently either for the plane in the scale space pyramid that lies above, at a higher scale, than the plane of the keypoint in the differential scale space or in a plane of the scale space pyramid that lies below, at a lower scale, than the keypoint. Either way, for each keypoint, the gradients are calculated all at one same scale in a rectangular area (e.g., patch) surrounding the keypoint. Moreover, the frequency of an image signal is reflected in the scale of the blurred image. Yet, SIFT simply uses gradient values at all pixels in the patch (e.g., rectangular area). A patch is defined around the keypoint; sub-blocks are defined within the block; samples are defined within the sub-blocks and this structure remains the same for all keypoints even when the scales of the keypoints are different. Therefore, while the frequency of an image signal changes with successive application of Gaussian smoothing filters in the same octave, the keypoints identified at different scales may be sampled with the same number of samples irrespective of the change in the frequency of the image signal, which is represented by the scale.

To characterize a keypoint orientation, a vector of gradient orientations may be generated (in SIFT) in the neighborhood of the keypoint 408 (using the Gaussian image at the closest scale to the keypoint's scale). However, keypoint orientation may also be represented by a gradient orientation histogram (see FIG. 4) by using, for example, Compressed Histogram of Gradients (CHoG). The contribution of each neighboring pixel may be weighted by the gradient magnitude and a Gaussian window. Peaks in the histogram correspond to dominant orientations. All the properties of the keypoint may be measured relative to the keypoint orientation, this provides invariance to rotation.

In one example, the distribution of Gaussian-weighted gradients may be computed for each block, where each block is 2 sub-blocks by 2 sub-blocks for a total of 4 sub-blocks. To compute the distribution of the Gaussian-weighted gradients, an orientation histogram with several bins is formed with each bin covering a part of the area around the keypoint. For example, the orientation histogram may have 36 bins, each bin covering 10 degrees of the 360 degree range of orientations. Alternatively, the histogram may have 8 bins each covering 45 degrees of the 360 degree range. It should be clear that the histogram coding techniques described herein may be applicable to histograms of any number of bins. Note that other techniques may also be used that ultimately generate a histogram.

Gradient distributions and orientation histograms may be obtained in various ways. For example, a two-dimensional gradient distribution (dx, dy) (e.g., block 406) is converted to a one-dimensional distribution (e.g., histogram 414). The keypoint 408 is located at a center of a patch 406 (also called a cell or region) that surrounds the keypoint 408. The gradients that are pre-computed for each level of the pyramid are shown as small arrows at each sample location 408. As shown, 4×4 regions of samples 408 form a sub-block 410 and 2×2 regions of sub-blocks form the block 406. The block 406 may also be referred to as a descriptor window. The Gaussian weighting function is shown with the circle 402 and is used to assign a weight to the magnitude of each sample point 408. The weight in the circular window 402 falls off smoothly. The purpose of the Gaussian window 402 is to avoid sudden changes in the descriptor with small changes in position of the window and to give less emphasis to gradients that are far from the center of the descriptor. A 2×2=4 array of orientation histograms 412 is obtained from the 2×2 sub-blocks with 8 orientations in each bin of the histogram resulting in a (2×2)× 8=32 dimensional feature descriptor vector. For example, orientation histograms 413 and 415 may correspond to the gradient distribution for sub-block 410. However, using a 4×4 array of histograms with 8 orientations in each histogram (8-bin histograms), resulting in a (4×4)×8=128 element vector (i.e., feature descriptor) for each keypoint may yield a better result. Note that other types of quantization bin constellations (e.g., with different Voronoi cell structures) may also be used to obtain gradient distributions.

As used herein, a histogram is a mapping $k_i$ that calculates the weighted sum of observations, samples, or occurrences (e.g., gradients) that fall into various disjoint categories known as bins, where the weights correspond to significance of the observation (e.g., magnitude of the gradients, etc.). The graph of a histogram is merely one way to represent a histogram.

The histograms from the sub-blocks may be concatenated to obtain a feature descriptor vector for the keypoint. If the gradients in 8-bin histograms from 16 sub-blocks are used, a 128 dimensional feature descriptor vector may result. The descriptor may be normalized to gain invariance to illumination intensity variations, i.e.

$$\sum_{j=1}^{16}\sum_{i=1}^{m} k_i^{j2} = 1$$

for 16 weighted histograms where $k_i^j$ corresponds to the ith bin value of the jth sub-block.

In this manner, a descriptor may be obtained for each keypoint identified, where such descriptor may be characterized by a location (x, y), an orientation, and a descriptor of the distributions of the Gaussian-weighted gradients. Note that an image may be characterized by one or more keypoint descriptors (also referred to as image descriptors). Additionally, a descriptor may also include a location information (e.g., coordinates for the keypoint), a scale (e.g., Gaussian scale at with the keypoint was detected), and other information such as a cluster identifier, etc.

Once descriptors have been obtained for keypoints identified in a query image, a keypoint in the queried image 108 may be compared and/or matched to points in target images to perform feature matching 122. For instance, a descriptor for the keypoint in the queried image may be compared to one or more descriptors stored in a database of target images (corresponding to keypoints in the database of target images) to find one or more matches. This comparison may be a probabilistic comparison where a "match" is successful if a keypoint in the queried image corresponds to a point in a target image by at least a threshold amount or percentage (e.g., 75% match, 80% match, etc.). In this manner, keypoints in a query image are matched to keypoints in a target image.

PCA-SIFT for Descriptor Extraction

Principal Component Analysis (PCA) is a standard technique for dimensionality reduction and has been applied to a broad class of computer vision problems, including feature selection, object recognition, and face recognition. PCA-SIFT shows that gradient values in the neighborhood of a keypoint can be projected to a very small subspace obtained by PCA. As part of descriptor extraction, PCA may be used to linearly transform the data (i.e., keypoints in an image) from a high-dimensional space to a space of fewer dimensions. PCA performs a linear mapping of the data to a lower dimensional space in such a way, that the variance of the data in the low-dimensional representation is maximized.

To improve on SIFT descriptors, PCA-SIFT effectively changes the coordinate system for the patch to a new coordinate system based on achieving the greatest variance in the data set (i.e., keypoints within the image). PCA-SIFT involves an orthogonal linear transformation that transforms data (e.g., pixels, keypoints, etc.) to a new coordinate system such that the greatest variance by any projection of the data comes to lie on the first coordinate (called the first principal component), the second greatest variance on the second coordinate (second principal component), and so on. Mathematically, a projection matrix may be obtained by: (a) obtaining a gradient vector representing the horizontal and vertical gradients for each keypoint (e.g., gradient vector size for patch=39 pixel×39 pixels×2 gradient directions=3042 dimensional vectors), (b) combining the gradient vectors for all keypoint patches into a matrix A (matrix dimension=k patches×3042 vectors per patch), (c) calculate a covariance matrix A of matrix A, (d) calculate the eigenvectors and eigenvalues of covariance matrix A, and (e) select the first n eigenvectors to obtain a projection matrix (which is n×3042). This process is often referred to as eigenvalue decomposition.

In descriptor extraction procedures, dimensionality reduction has the advantage of reducing the noise and improving the matching accuracy. The PCA-SIFT algorithm may extract the descriptors based on the local gradient patches around the keypoints. PCA-SIFT can be summarized in the following steps: (1) pre-compute an eigenspace to express the gradient images of local patches; (2) given a patch, compute its local image gradient; (3) project the gradient image vector using the eigenspace to derive a compact feature vector (i.e., descriptor). This feature vector (i.e., descriptor) is significantly smaller than the standard SIFT feature vector (i.e., descriptor), and can be used with the same matching algorithms. The Euclidean distance between two feature vectors (i.e., descriptor) is used to determine whether the two vectors correspond to the same keypoint in different images. Distinctiveness of descriptors is measured by summing the eigenvalues of the descriptors, obtained by the Principal Components Analysis of the descriptors normalized by their variance. This corresponds to the amount of variance captured by different descriptors, therefore, to their distinctiveness.

Figure 5:
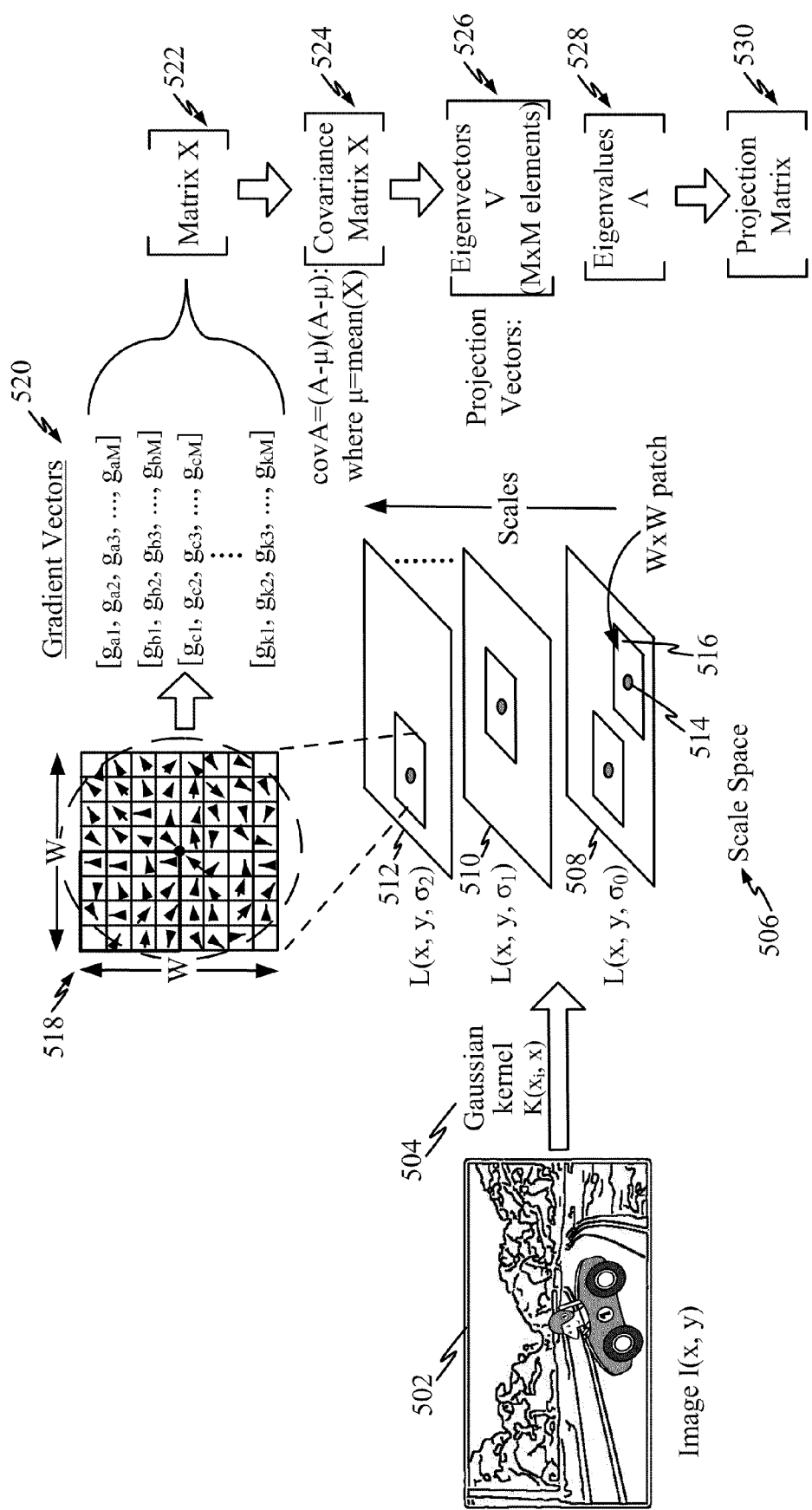
FIG. 5 illustrates how PCA-SIFT descriptors may be obtained.

FIG. 5 illustrates how PCA-SIFT descriptors may be obtained. Like the example for SIFT descriptors (FIGS. 3-4), an image I(x, y) 502 is convolved with one or more Gaussian kernels $G(x, y, \sigma_i)$ 504 to obtain a plurality of scale spaces 506 (i.e., a Gaussian pyramid). Here, the scale spaces 508, 510, and 512 are illustrated, corresponding to different kernel scaling parameters $\sigma_0$, $\sigma_1$, and $\sigma_2$, respectively. For local keypoint descriptors, PCA-SIFT uses the same inputs as the standard SIFT descriptor (e.g., the sub-pixel location, scale, and dominant orientations of the keypoint). In this example, a plurality of keypoints 514 have been detected across different scale levels (and/or octaves). A patch 516 is defined around each keypoint 514. A patch 518 may have a W×W dimension (e.g., 39 pixels by 39 pixels) and may be extracted at a given scale, centered over a corresponding keypoint, and rotated to align its dominant orientation to a canonical direction. A gradient matrix $[g_{a1}, g_{a2}, g_{a3}, \ldots, g_{aM}]$ 520 may be obtained for each patch 518 and the gradient matrices are vectorized into a matrix A 522. A covariance matrix X 524 of matrix X 522 is then generated. The eigenvectors V 526 and eigenvalues $\Lambda$528 for the covariance matrix X 524 are obtained which can then be used to generate a projection matrix V 530 from the d largest eigenvalues (i.e., largest variance).

Obtaining a PCA-SIFT descriptor typically requires taking the inner product between a PCA basis (projection) vector V and an image patch $I_{patch}$ for a keypoint of interest. In essence, the image patch $I_{patch}$ for the keypoint may be "projected" to a higher scale where it is represented by a single point in that higher scale. A PCA basis (projection) vector V may be represented as $$V = \sum_{i=1}^{m} \alpha_i K(x_i, x), \quad \text{(Equation 3)}$$

where $\alpha_I$ is a scaling coefficient, $K(x_i, x)$ is a Gaussian basis function (i.e., smoothing kernel) at location $x_i$, m are the number of locations sampled in the patch. The inner product between the PCA basis vector V and the image patch $I_{patch}$ is given by transposing the basis vector V and image patch $I_{patch}$ such that $$V^T I_{patch} = \sum_{i=1}^{m} \alpha_i K^T(x_i, x) I_{patch}, \quad \text{(Equation 4)}$$

Therefore, in one example, calculating the inner product between an image patch $I_{patch}$ (e.g., image patch 514 or 516) and the PCA basis (projection) vector V is a pixelwise operation requiring $W^2$ multiplications and $W^2$ additions.

PCA basis (projection) vectors are obtained from a training set of vectors and the query descriptors are projected to this subspace. Let $X=\{x_1, x_2, \ldots, x_N\}$ be N training patches with $X_i \in R^p$ and $p=W^2$ is the dimensionality W×W of each patch sampled around the keypoint. The covariance matrix of the patches is estimated as $$\sum = \frac{1}{N} \sum_{i=1}^{N} (x_i - \mu)(x_i - \mu)^T, \text{ where } \mu = \frac{1}{N} \sum_{i=1}^{N} x_i$$

is the sample mean. The eigenvectors of the covariance matrix provide the basis vectors which are sufficient to represent all of the patch variations. The basis (projection) vectors are given by $\Sigma V = V\Lambda$, where $V=\{v_1^T, v_2^T, \ldots, v_p^T\}^T$ is the eigenvector matrix, $\Lambda=\{\lambda_1, \lambda_2, \ldots, \lambda_p\}$ is the diagonal matrix with the corresponding eigenvalues in its diagonal. The goal in this decomposition is to extract a d-dimensional subspace that reduces the noise by maximizing the variance, where $d=\{1, 2, \ldots, n\}$. This is given by the eigenvectors $\hat{V}=\{v_1^T, v_2^T, \ldots, v_p^T\}^T$ that are associated with the largest d eigenvalues. One way to select d is to keep ~90% of the total variance in the data. A descriptor q from a test image is projected onto the PCA subspace by $\hat{V}^T (q-\mu)$. This requires d×p multiplications and d×p additions, where $d \times p = d \times W^2$.

Implementation of PCA-SIFT may be hindered on platforms with limited processing resources, such as mobile devices, due to the large computational costs associated with PCA projections of descriptors to a low dimensional subspace, exacerbated by the number of keypoints (can be in thousands). For instance, a PCA-SIFT patch size (W×W) is 39 pixels×39 pixels, which results in a $2 \ast 39^2$ dimensional projection vectors considering the gradient values in x and y direction. Hence, each descriptor in the query image requires $2 \ast 39^2 \ast d$ multiplications and additions for a projection to a d-dimensional subspace. While this may not generate significant inefficiency for powerful server-side machines, it may be a bottleneck in implementations with limited processing resources, such as mobile phones.

Fast Gradient-Based Descriptor Extraction in Scale-Space Using Sparse PCA-SIFT

A sparse subspace projection algorithm is described for efficient extraction of descriptors from local gradient patches. The descriptors are obtained by projecting the local gradient patch to PCA subspace that is represented by sparse combinations of the Gaussian basis functions. The standard deviation of the Gaussian basis functions is selected from one of the differences of scales in the Gaussian scale-space pyramid. Hence, projection of the patches to the PCA subspace can be obtained by simply multiplying the sparse coefficients to the corresponding gradients in the scale-space.

A sparse PCA-SIFT algorithm is herein described that has a very low computational complexity for projecting the test samples to the subspace. Rather than computing the PCA basis vectors (i.e., PCA projection vector V 526 FIG. 5), PCA basis vectors are instead obtained as sparse linear combinations of Gaussian basis functions, whose standard deviations are selected from the scale level differences of the Gaussian scale-space. This allows projecting a given patch onto the subspace by a sparse inner product. The sparse PCA-SIFT algorithm can easily be extended to other feature extraction techniques.

Figure 6A:
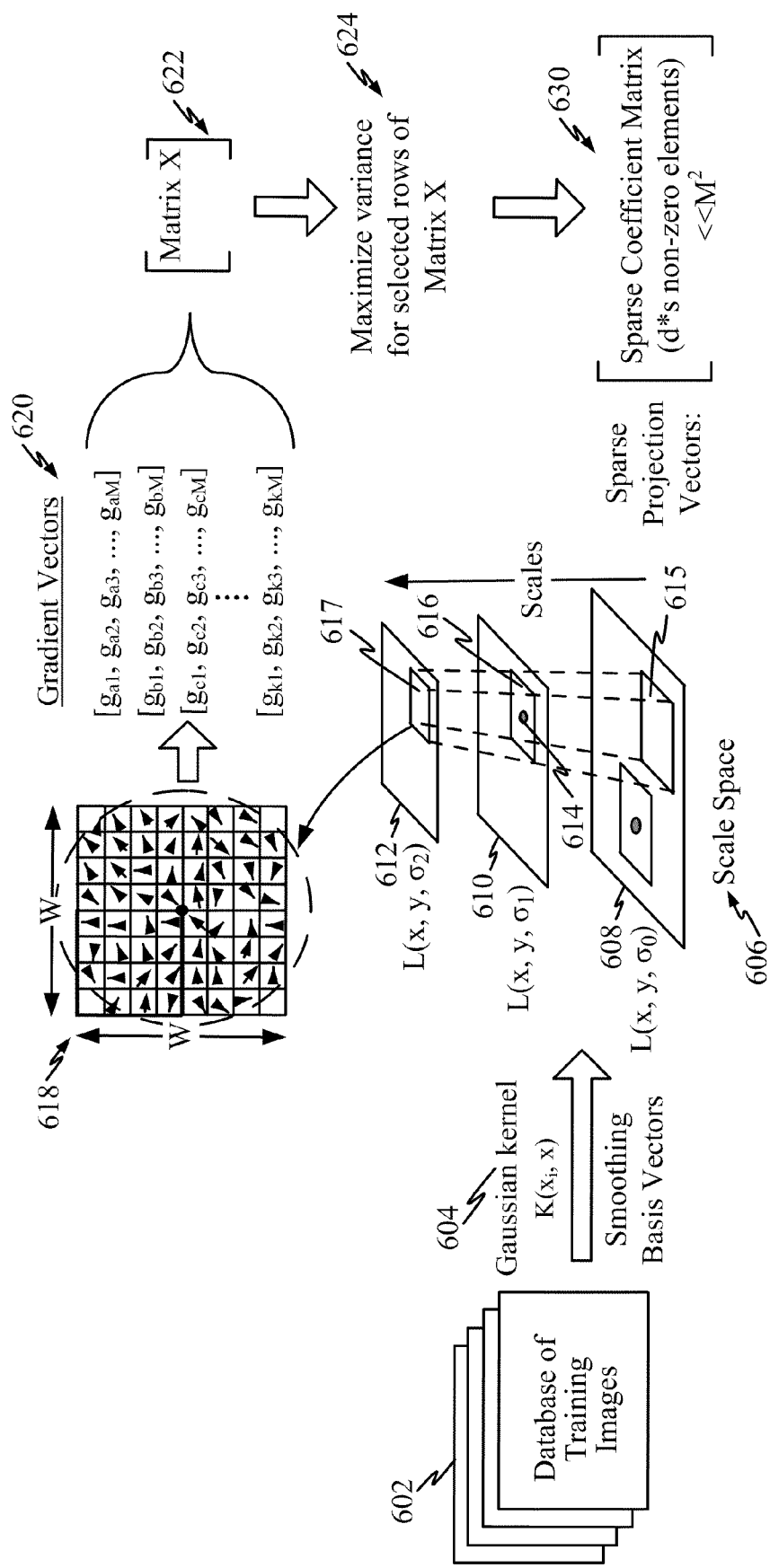
FIG. 6 (comprising FIGS. 6A and 6B) illustrates an example of how a sparse PCA-SIFT algorithm may be performed.
Figure 6B:
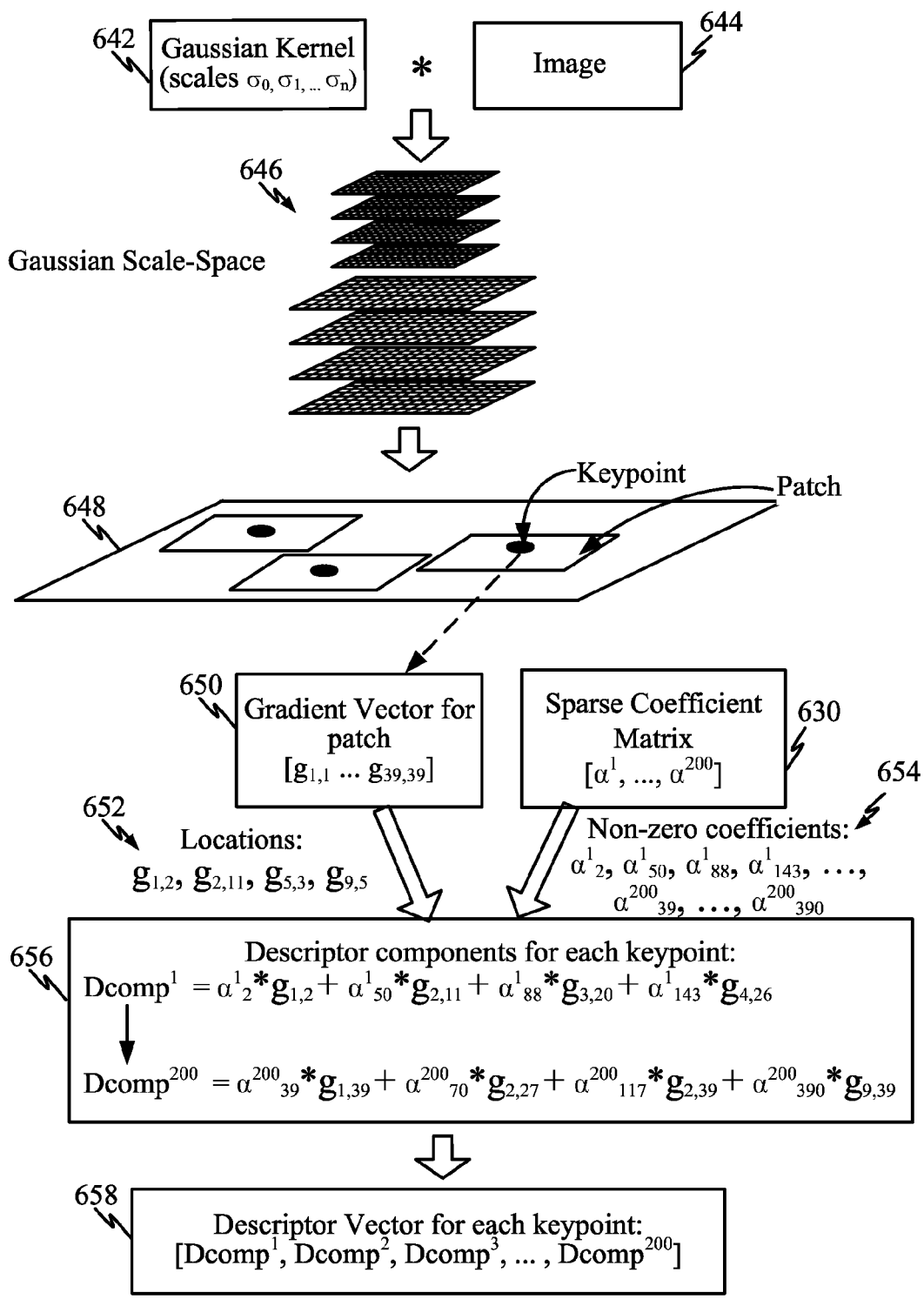

FIG. 6 (comprising FIGS. 6A and 6B) illustrates an example of how a sparse PCA-SIFT algorithm may be performed. However, it should be clear that this process may be extended and/or applied to other types of algorithms.

FIG. 6A illustrates an offline training procedure for a sparse PCA-SIFT algorithm to obtain a sparse coefficient matrix. A library of training images 602 may be convolved with a Gaussian kernel 604 at different scales to generate a Gaussian Scale-Space 606 for each image. For each image, keypoints may be detected across a plurality of scales 608, 610, and 612 and a patch 616 is defined around each keypoint. In this example, a first keypoint 614 has been identified a corresponding patch 616 has been defined around the keypoint 614. This patch 616 may be projected across multiple scale levels of the scale space 606 to obtain local information for one or more corresponding patches 617 above and/or one or more corresponding patches 615 below the keypoint 616. In the following, the salient information from a given patch is contained in a matrix $[g_{ij}]$ where the indices i and j are coordinates of the pixels in the patch. The components of the matrix could be the pixel intensity values themselves or as illustrated in the figures, they could denote the total gradient magnitude at each pixel, or more generally, it can also represent the gradient values in the x and y directions. It should be clear that the patch shape need not be square but can take other forms, such as rectangular, circular, etc., so long as the same patch shape is subsequently used in generating descriptors. Note that, in some examples, the gradient matrix may include just information for the patch 616 at the same scale as the keypoint 614. In other implementations, the gradient matrix may include information for corresponding patches 615 and/or 617 at different scales. The plurality of gradient matrices 620 may then be vectorized into a matrix X 622. A plurality of rows of matrix X 622 are then selected (e.g., randomly selected) and their variance is maximized 624 to obtain a sparse coefficient matrix 630. Because just a subset of the rows of Matrix X 622 are used for variance maximization, only a few non-zero coefficients are generated for each projection vector (i.e., column) of the sparse coefficient matrix 630. The remaining coefficients in the sparse coefficient matrix are zero. Note that, in one example, each coefficient in a column (i.e., projection vector) of the sparse coefficient matrix 630 corresponds to a location within a patch. Such location may be inherently identified by the location of the coefficient within its column in the sparse coefficient matrix 630. Alternatively, the location for each non-zero coefficient may be provided along with the non-zero coefficients.

Once the sparse coefficient matrix 630 has been obtained, it may be used to generate keypoint descriptors for both a library of images and a query image. The coefficients in each column of the sparse coefficient matrix 630 represent a sparse projection vector.

FIG. 6B illustrates a process for online generation of descriptors using Sparse PCA-SIFT based on a sparse coefficient matrix. An image 644 (e.g., either a database image or a query image) is convolved with a Gaussian kernel 642 to generate a Gaussian scale-space 646 across a plurality of scales. One or more keypoints may then be identified from the scale spaces 646. For each keypoint, a patch of surrounding pixels (e.g., sample points) is generated. For each patch, a gradient vector 650 is generated for the patch, where the gradient vector may include the magnitude of a gradient for each of the points in the patch. In this example, the patch may be 39×39 pixels (e.g., points) and so the gradient vector $[g_{1,1} \ldots g_{39,39}]$ 650 may include 1521 elements. As previously noted, only some of the coefficients in the sparse coefficient matrix are non-zero. In this example, the non-zero coefficients are $\alpha^1_2, \alpha^1_{50}, \alpha^1_{88}, \alpha^1_{143}, \ldots \alpha^{200}_{39}, \ldots, \alpha^{200}_{390}$. For these non-zero coefficients, the corresponding gradient magnitude value (i.e., corresponding to the same location in the patch) is obtained. In this example, the locations 652 for gradients $g_{1,2}, g_{2,11}, g_{3,20}, g_{4,26}$ have been identified to correspond to the non-zero coefficients 654. For each column of the sparse coefficient matrix, each of the non-zero coefficients is multiplied by the corresponding gradient and the results are added together on a per column basis to obtain a plurality of descriptor components 656. The plurality of descriptor components are combined into a vector to obtain the keypoint descriptor 658. This process may be repeated for a plurality of keypoints to obtain a plurality of corresponding descriptors for the image 644. Note that in this example the patch around the keypoint is defined at a single scale level. In general multiple patches across multiple scales around the keypoint can be used as shown in patches 615, 616, and 617.

Exemplary Process for Generating Sparse Projection Vectors

Figure 7A:
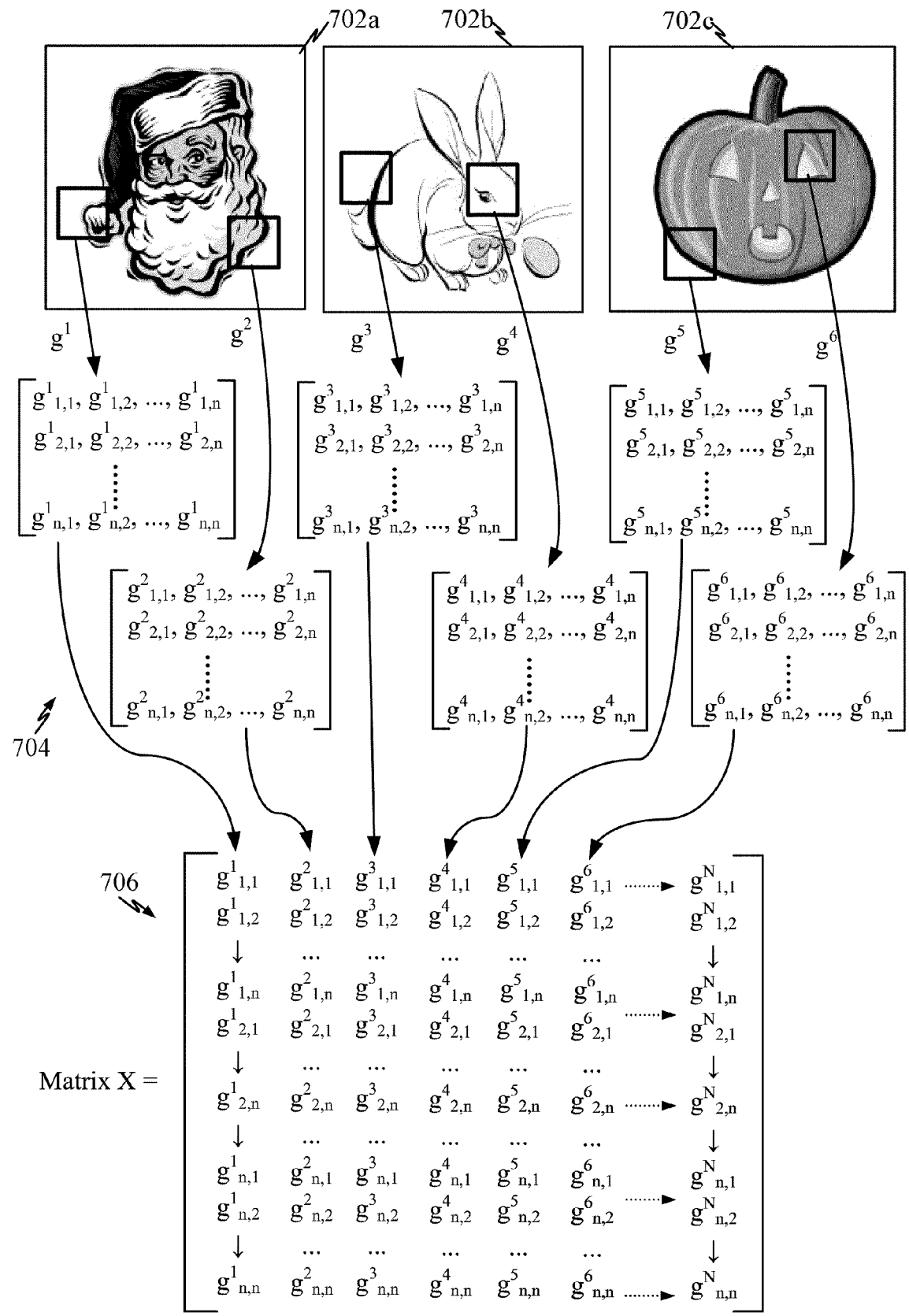
FIG. 7 (comprising FIGS. 7A, 7B, and 7C) illustrates a process for estimating or generating a sparse projection vector.
Figure 7B:
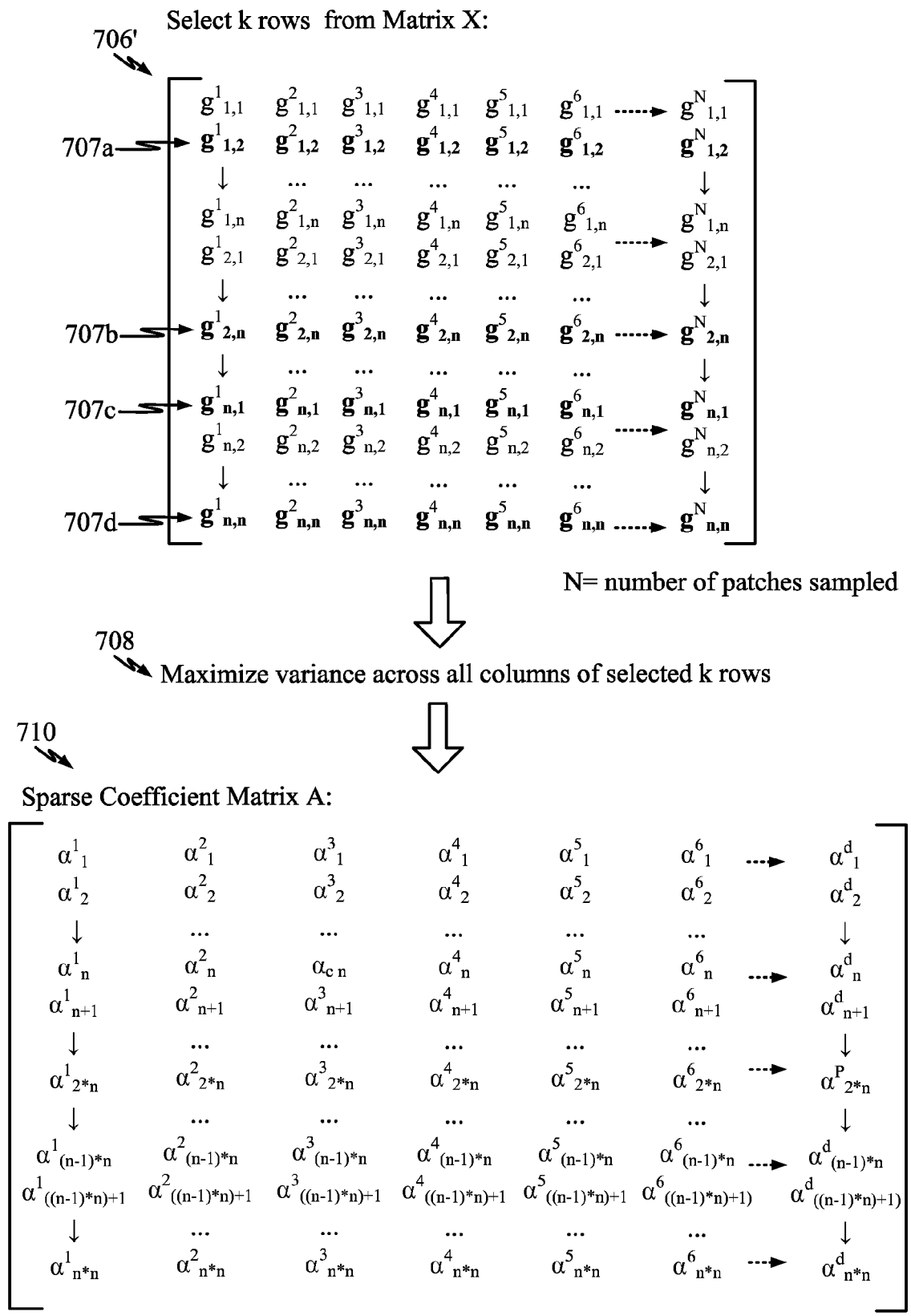

FIG. 7 (comprising FIGS. 7A, 7B, and 7C) illustrates a process for estimating or generating a sparse projection vector. A plurality of training images 702a, 702b, and 702c may be obtained. For each keypoint detected in those images, a patch is built around the keypoint. A gradient matrix is obtained for each patch which is represented as a matrix 704, where each element g of the matrix may represent a magnitude for each corresponding sample, point, or pixel in the n×n patch (e.g., n=39). Note that each gradient matrix 704 may be constructed or arranged such that the position of each element g has a predictable or known location within its corresponding patch. The plurality of gradient matrices 704 (which may represent patches for a plurality of training images) may then be vectorized into a Matrix X 706. A plurality of k rows from Matrix X 706 may then be randomly or non-randomly selected as illustrated in matrix 706'. In this example, k=4 and rows 707a, 707b, 707c, and 707d have been selected. Variance across the selected rows of Matrix X 706 is then maximized 708 to obtain a sparse coefficient matrix 710. The coefficients in the sparse coefficient matrix 710 are selected to achieve maximum variance.

In one implementation, only a few coefficients in each column of the sparse coefficient matrix 710 are non-zero coefficients. The remaining coefficients may be zero. Exemplary sparse coefficient matrix 712 only shows those components that are non-zero. Additionally, in some implementations, the number of columns in the sparse coefficient matrix 710 may be truncated to d columns (e.g., d=200 columns). Each of the resulting columns of the sparse coefficient matrix may be a sparse projection vector, which may span a patch. For instance, a column (containing $n^2$ elements) of the sparse coefficient matrix 710 may be mapped to an n×n patch 714 as illustrated.

In various implementations, the sparse coefficient matrix 710 may be generated across a plurality of patches at different levels of an image scale space. Thus, for each additional scale space level, additional rows may be added to matrix 710 or additional matrices may be generated.

Figure 8:
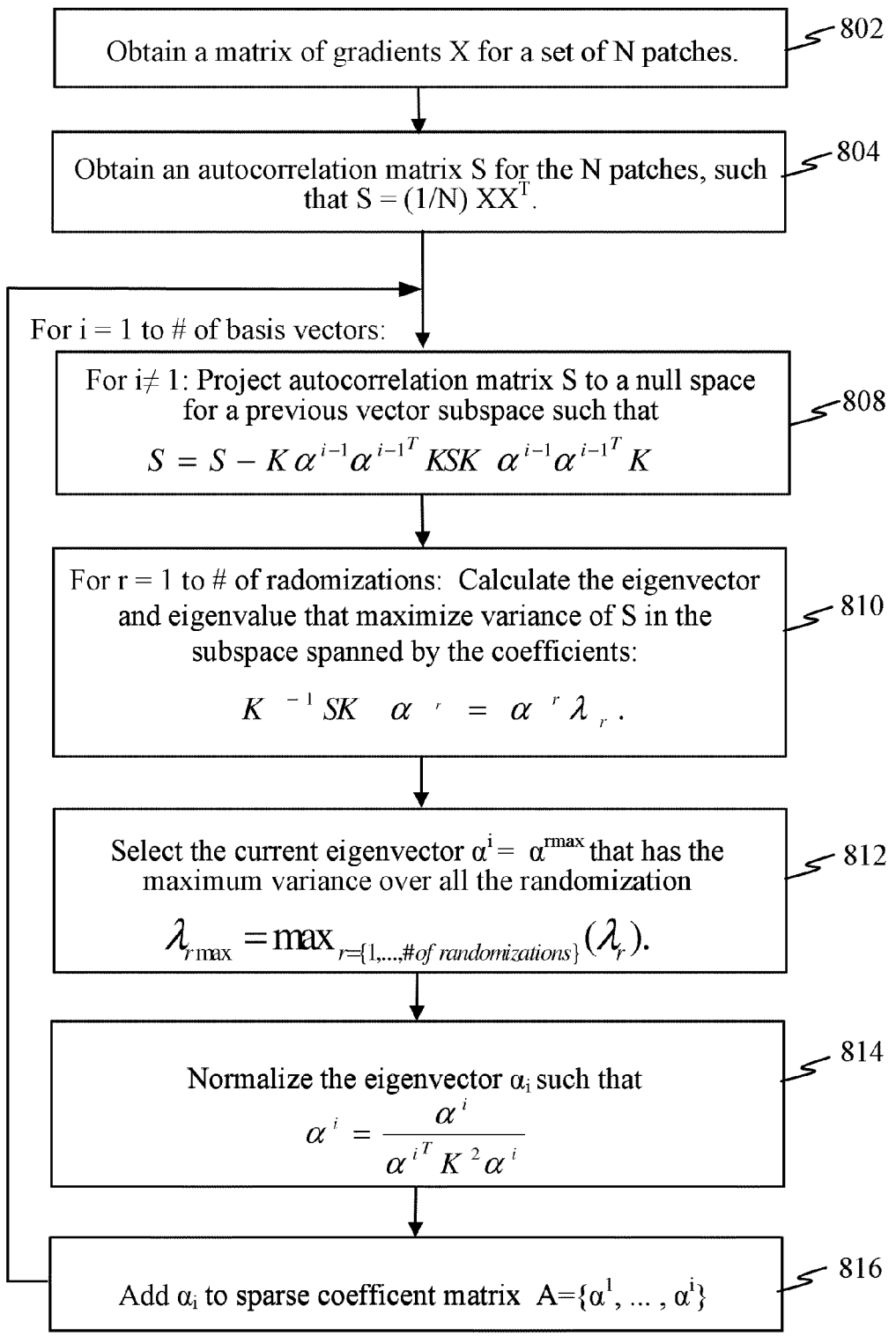
FIG. 8 illustrates an exemplary algorithm for iteratively generating a sparse projection matrix using sparse PCA-SIFT.

FIG. 8 illustrates an exemplary algorithm for iteratively generating a sparse projection matrix using sparse PCA-SIFT. A matrix of gradients X is obtained for a set of N patches 802. An autocorrelation matrix S is obtained for the matrix of gradients X such that $S=(1/N)XX^T$ 804. The autocorrelation matrix S may define a relation between each dimension of the patches. The autocorrelation matrix S for the matrix X of N patches may be given by:

$$S = \frac{1}{N}\sum_{i=1}^{N} x_i x_i^T. \qquad \text{(Equation 5)}$$

where $x_i$ represents a vector for each training patch.

Note that the basis vectors for the autocorrelation matrix S can be obtained by the eigenvalue decomposition $SV=V\Lambda$, where V and $\Lambda$ are the eigenvector and the corresponding eigenvalue matrices. From Equation 4 it is observed that a PCA basis (projection) vector may be represented as $V=K(x_i, x)\alpha$. To obtain eigenvectors based on Gaussian basis functions, basis vectors are obtained from a smoothing kernel matrix K, i.e. $V=K\alpha$, where $\alpha$ is a sparse coefficient vector. K is defined as the n×n matrix with row i and column j, such that $$K(x_i, x_j) = \exp\left(\frac{-(x_i - x_j)^2}{2\sigma^2}\right), \qquad \text{(Equation 6)}$$

and each column j corresponds to a Gaussian function defined at the corresponding pixel location $x_j$ and $\sigma$ is the standard deviation of the kernel, i.e., $\sigma^2=\sigma_2^2-\sigma_1^2$ for different kernel scaling parameters $\sigma_1$ and $\sigma_2$.

This kernel matrix K of Equation 6 is very powerful, since it can construct a large number of functions over the image domain by simply forming linear combinations of its columns. Furthermore, the correlation with a column of the kernel matrix K can simply be obtained by a pixel value at a higher scale level in the Gaussian scale space pyramid since the image was already been convolved with the kernel matrix K. To do this, the kernel parameter $\sigma$ may be selected from one of the scale-level differences of the Gaussian scale-space pyramid. Note that, since most of the descriptor based procedures build the Gaussian scale-space pyramid in advance, obtaining the correlation with a Gaussian basis function comes for free (i.e., no additional processing is needed).

Figure 9:
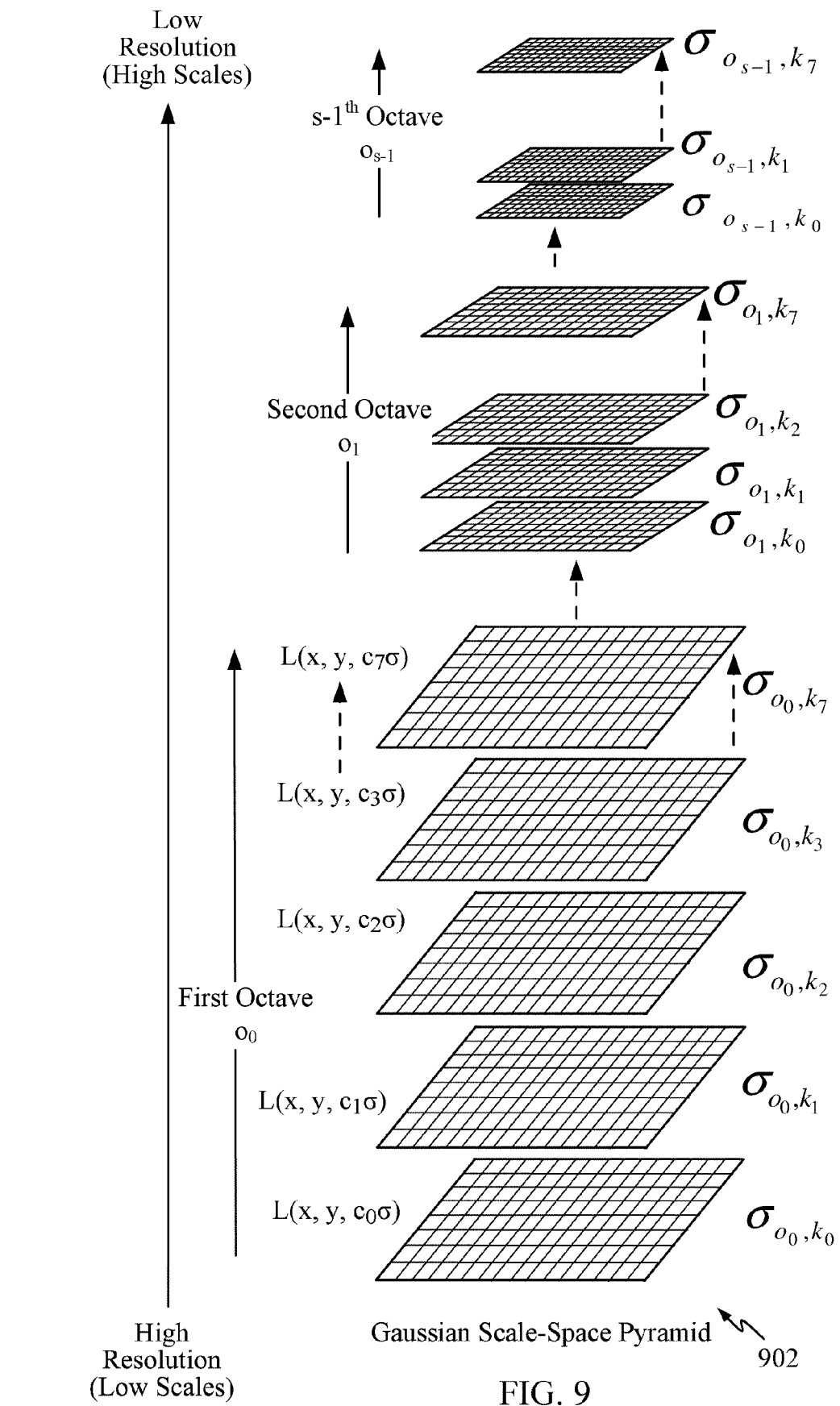
FIG. 9 illustrates a Gaussian scale-space pyramid having a plurality of octaves, each octave having a plurality of scale levels.

In order to obtain this correlation, the set of possible $\sigma$ selections may be constrained with the scale differences of the Gaussian scale-space levels. FIG. 9 illustrates a Gaussian scale-space pyramid 902 having a plurality of octaves, each octave having a plurality of scale levels. The scale levels may be given by $$\sigma_{o,k}=2^{(k/s)}2^o, \qquad \text{(Equation 7)}$$

where o is the octave level, k is the scale level within an octave and s is the number of scale levels within each octave. If a keypoint is detected at level $(o_0, k_0)$ then the Gaussian basis function standard deviation should be $\sigma\sigma_{o_0, k_0}$ for the unresized patch opened around the keypoint. Instead of correlating the patch with these basis functions, a higher scale level of the pyramid is used, e.g. $(o_1, k_1)$ with $o_1 > o_0$, and/or $k_1 > k_0$. Hence, $$\sigma\sigma_{o_0,k_0} = \sqrt{\sigma_{o_1,k_1}^2 - \sigma_{o_0,k_0}^2} \quad \text{(Equation 8)}$$

gives the possible set of scales:

$$\sigma = \sqrt{2^{\left(\frac{k_1-k_0}{s}\right)} 2^{o_1-o_0} - 1} \quad \text{(Equation 9)}$$

such that $o_1 > o_0$ and/or $k_1 > k_0$. This means that, if a sub-space projection vector can be calculated using the linear combination of the Gaussian basis functions with these standard deviations $\sigma$, the computation of the image response to this vector is reduced to a sampling of the corresponding locations in the scale-space.

The basis vectors of the autocorrelation matrix S may be given by $SK\alpha = K\alpha\lambda$. Multiplying both sides of the equation with the smoothing kernel matrix K turns the problem into a generalized eigenvalue decomposition problem, $KSK\alpha = K^2\alpha\lambda$. The goal is to find a sparse set of coefficients $\alpha$ for the Gaussian basis functions. In other words, the cardinality of the non-zero coefficient elements $\alpha$, $\text{card}(\alpha \neq 0)$, needs to be much smaller than its dimensionality. Finding the optimal number of non-zero coefficient elements $\alpha$ and their values is known to be a non-deterministic polynomial-time hard problem. Many approximations are defined in the literature which minimize a penalty term that is a very loose upper bound on the cardinality of $\alpha$, such as L-1 norm $\|\alpha\|$.

Referring again to the method in FIG. 8, one example for obtaining the non-zero coefficient elements $\alpha$ is illustrated. The variance of matrix S may iteratively maximized for a plurality of random locations in each patch. An iterative process may be used to generate a plurality of sparse projection vectors $\alpha^i$ (a vector with $n^2$ components) that make up a sparse coefficient matrix A (where $A = [\alpha^1, \ldots, \alpha^i]$). At each iteration (i=1 to d, number of basis vectors), several candidate vectors $\alpha^i$ are randomized by randomly selecting the number and positions of the non-zero coefficients $\alpha$. This may be done by calculating the eigenvector and eigenvalue that maximizes variance of the autocorrelation matrix S in the subspace spanned by the coefficients such that: $K^{-1}SK\alpha_r = \alpha_r$, where r=1 to number of randomizations 810.

The current eigenvector $\alpha^i = \alpha^{rmax}$ that has the maximum variance over all the randomizations is selected such that: $\lambda_{r\,max} = \max_{r=\{1, \ldots, \#\,of\,randomizations\}} (\lambda_r)$ 812.

The eigenvector $\alpha^i$ with the largest variance is thus selected and the eigenvector $\alpha^i$ is normalized such that $$\alpha^i = \frac{\alpha^i}{\alpha^{iT} K^2 \alpha^i} \mathbf{814}.$$

Each of these normalized eigenvectors $\alpha_i$ may then be added to the sparse coefficient matrix $A = [\alpha^1, \ldots, \alpha^d]$) 816.

For each iteration (where i≠1), the autocorrelation matrix S is projected to a nullspace for a previous vector subspace such that: $S = S - K\alpha^{i-1}\alpha^{i-1^T} KSK\alpha^{i-1}\alpha^{i-1^T} K$ 808.

Having obtained the sparse coefficient matrix $A = \{\alpha^1, \ldots, \alpha^d\}$, a projection matrix V is then given by multiplying with the kernel matrix K, i.e. V=KA. A patch q from a query image can be projected to the subspace by $q^T KA$. Since $q^T K$ is equivalent to Gaussian convolution of the patch q and is given by the higher levels of the scale-space, the patch q can be projected to the subspace by multiplying the non-zero elements of the sparse coefficient matrix A with the corresponding pixels sampled from the scale-space.

Exemplary Process for Generating Descriptors by Using Sparse Projection Vectors

Figure 10A:
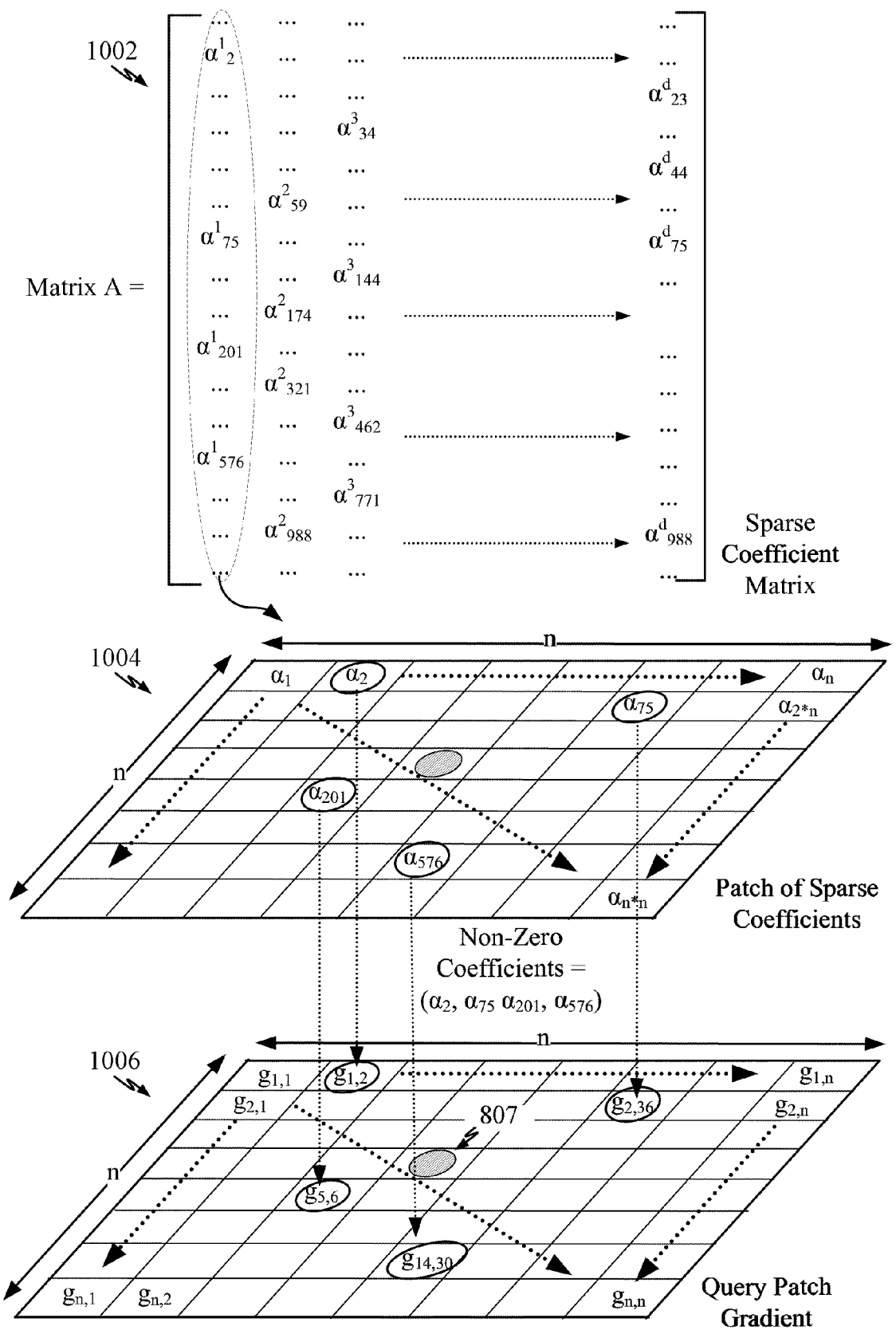
FIG. 10 (comprising FIGS. 10A and 10B) illustrates how feature descriptors may be generated based on a sparse projection matrix.

FIG. 10 (comprising FIGS. 10A and 10B) illustrates how feature descriptors may be generated based on a sparse projection matrix. Here, a sparse projection matrix A 1002 has been obtained offline (as illustrated in FIG. 7). In this example, a first projection vector (i.e., first column) includes the non-zero coefficients $\alpha^1_2$, $\alpha^1_{75}$, $\alpha^1_{201}$, and $\alpha^1_{576}$. These coefficients may be mapped to an n×n patch 1004 as illustrated (e.g., n=39).

For a query image, a keypoint 1007 may be obtained and a patch 1006 is built around the keypoint 1007. Here, the gradients g around the keypoint 1007 are illustrated for the query patch. Each gradient g may be a magnitude associated with each point or pixel in the patch. A plurality of descriptor components Dcompi 1008 may be generated by multiplying the magnitude g and corresponding coefficient $\alpha$. Here, the location of the non-zero coefficients $\alpha$ are known from the sparse coefficient matrix 1002. Therefore, just the gradient magnitudes at the corresponding locations in the patch 1006 (for non-zero coefficients $\alpha$) need be used. Each descriptor component Dcomp may be the combination (e.g., sum) of the non-zero coefficients and corresponding gradient magnitudes g, such that $Dcomp = \alpha_2 * g_{1,2} + \alpha_{50} * g_{2,7} + \alpha_{88} * g_{5,3} + \alpha_{143} * g_{9,5}$. This is repeated for all columns or a plurality of columns of the sparse projection matrix 1002 using the corresponding non-zero coefficients. A descriptor vector 1010 may then be built by concatenating the descriptor components Dcomp.

Therefore, according to one example, each feature/keypoint descriptor 1012 may comprise a plurality of descriptor elements/components $[Dcomp^1_m, Dcomp^2_m, Dcomp^3_m, \ldots, Dcomp^d_m]$, where each element $$Dcompi_j = \sum_{i=1}^{s} \alpha^j_{IX(i)} * I_i$$

for a sample point $I_i$, where IX(i) is the corresponding non-zeros coefficient index. The location(s) of one or more sample points for each patch are the corresponding locations for the coefficients $\alpha^i_j$ (found during offline training).

It should be noted that the sparse coefficient matrix may be represented in a number of different ways. In the example illustrated in FIG. 10, the patch location is implicit in the position of each In particular, given that only a subset of coefficients are non-zero coefficients, the size of the sparse coefficient matrix may be reduced by providing just the non-zero coefficients and their corresponding patch locations.

FIG. 11 illustrates an exemplary representation of a sparse projection matrix as non-zero coefficients 1102 and their corresponding patch locations 1104. Here, a patch identifier may be used to correlate a non-zero coefficient and a patch location. Here, each element $\alpha^{i,k}$ may be vector of coefficients $[\alpha^{i,k}_{IXi,k(1)}, \alpha^i_{IXi,k(2)}, \alpha^i_{IXi,k(3)}, \ldots, \alpha^i_{IXi,k(s)}]$, where s is the number of selected non-zero coefficients. The average non-zero coefficients per projection vector may be, for example, s={4, 5.63, 9.41}. For each element $\alpha^{i,k}$, a corresponding location vector $IX_{i,k}(j)$ is provided, where $IX_{i,k}(j)$ gives the corresponding location vector of the corresponding patch (i) for the dimensionality (k) and sample (j) (e.g., coordinates) $[IX_{1,1}(j), \ldots IX_{m,d}(j)]$ for $j=1, 2, \ldots, s$.

Note that the sparse coefficient matrix A 1002 (FIG. 10) may be represented in various other equivalent forms, such as a list of scaling coefficients and/or positions, one or more scaling coefficient and position tables, and/or a combination of vectors, matrices, and/or tables.

Exemplary Process for Generating Descriptors by Using Sparse Projection Vectors

Figure 12:
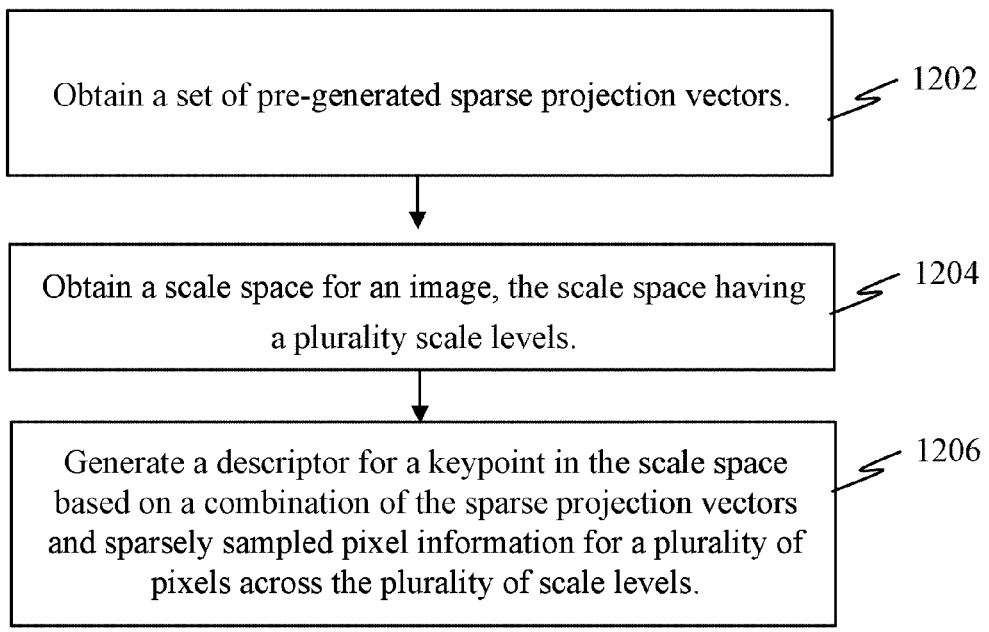
FIG. 12 illustrates a method for generating a feature descriptor by using predefined sparse projection vectors.

FIG. 12 illustrates a method for generating a feature descriptor by using predefined sparse projection vectors. A set of pre-generated sparse projection vectors may be obtained 1202. A scale space for an image is then obtained, where the scale space has a plurality scale levels 1204. Then, a descriptor for a keypoint in the scale space may be generated based on a combination of the sparse projection vectors and sparsely sampled pixel information for a plurality of pixels across the plurality of scale levels 1206. The pixel information may include gradient information for each pixel within a patch associated the keypoint. The plurality of pixels may be selected at pre-determined locations corresponding to non-zero coefficients for the sparse projection vectors.

The sparse projection vectors may be generated independent of the image (e.g., prior to having knowledge of which image is being processed). In one example, each sparse projection vector may be constrained to scales of a smoothening kernel for the image. A sparse projection vector may include a majority of zero elements and a plurality of non-zero elements. The non-zero elements are obtained by a variance maximization procedure.

In various implementations, each of the sparse projection vectors maximize or minimize an objective function. For instance, the objective function is maximization of an auto-correlation matrix for pixel information across a plurality of scale levels for a training set of images.

Figure 13:
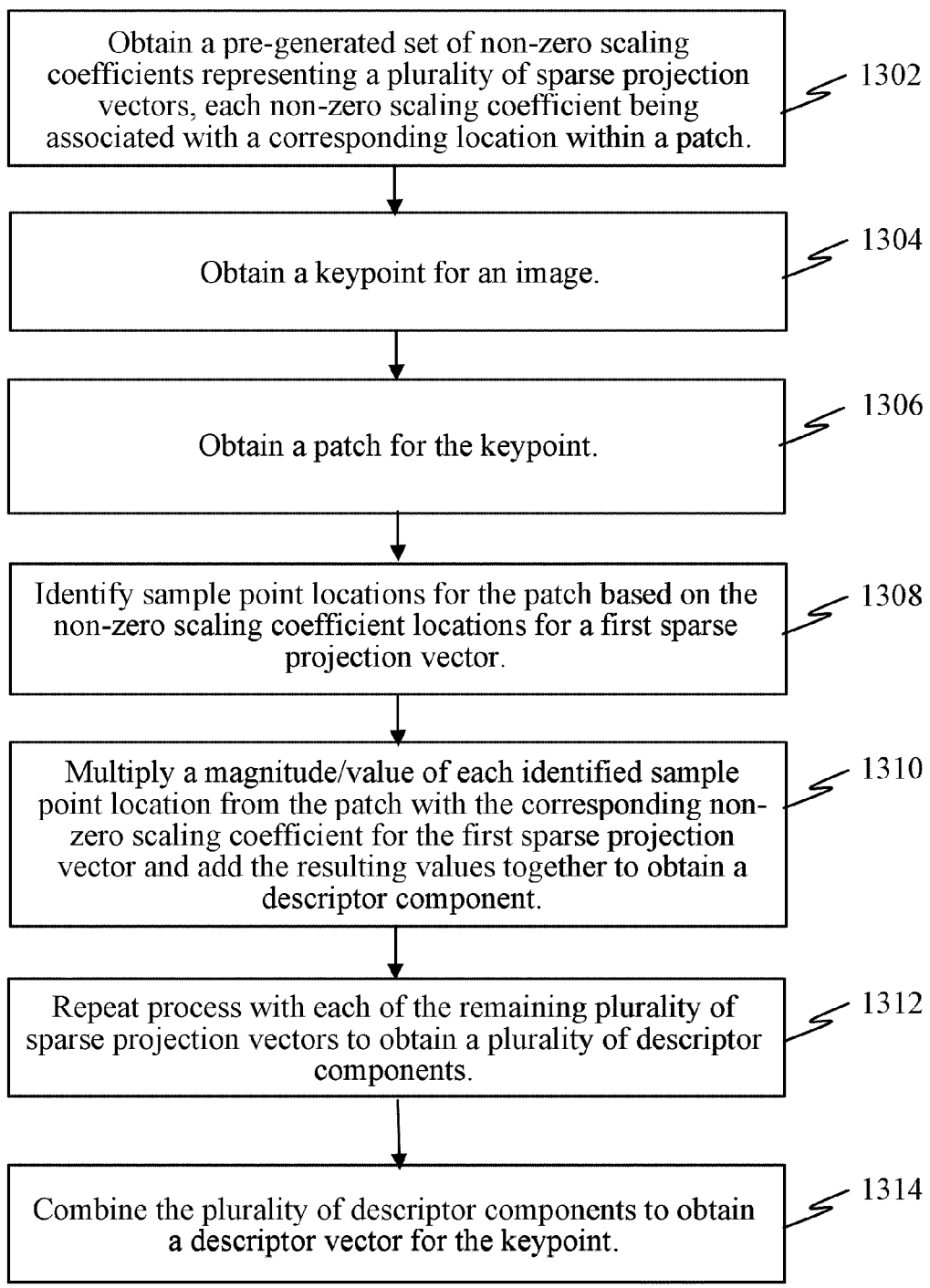
FIG. 13 illustrates another method for generating a feature descriptor by using predefined sparse projection vectors.

FIG. 13 illustrates another method for generating a feature descriptor by using predefined sparse projection vectors. A pre-generated set of non-zero scaling coefficients representing a plurality of sparse projection vectors may be obtained, where each scaling coefficient being associated with a corresponding location within a patch 1302. For example, such sparse projection vectors may be obtained as illustrated in FIGS. 7 and 8. Such sparse projection vectors may be calculated offline, may be part of a sparse coefficient matrix, and/or may be constrained to the scales of a smoothening kernel for the image. A keypoint may then be obtained for an image 1304. Note that the sparse projection vectors may be independent of the image. For example, the projection vectors may be generated based on a training set of images that exclude the image. A patch may then be obtained or defined for the keypoint 1306. A descriptor for the keypoint may then be generated based on a plurality of descriptor components. Each descriptor component generated by the following process. Sample point locations for the patch are identified based on the non-zero scaling coefficient locations for a first sparse projection vector 1308. A magnitude/value of each identified sample point location from the patch is multiplied (or otherwise combined) with the corresponding non-zero scaling coefficient for the first sparse projection vector and the resulting values are added together to obtain a descriptor component 1310. Such multiplication and addition process is illustrated in FIG. 10B for example. This process is then repeated with each of the remaining plurality of sparse projection vectors to obtain a plurality of descriptor components 1312. The plurality of descriptor components are then combined to obtain a descriptor vector for the keypoint 1314.

Note that a descriptor element may be thought of as a weighted sum of a sample point within the patch projected to a higher level of the scale-space for the image. Consequently, the keypoint descriptor is a weighted combination of the subset of sample points from the patch projected to different levels of the scale-space for the image. Because a descriptor is based on keypoint and patch information, the descriptor identifies one or more characteristics of the keypoint and/or its patch. Since sparse projection vectors are used (e.g., where only a few elements of the projection vectors are non-zero), the keypoint descriptor may be generated with fewer operations than the size of the patch.

Figure 14:
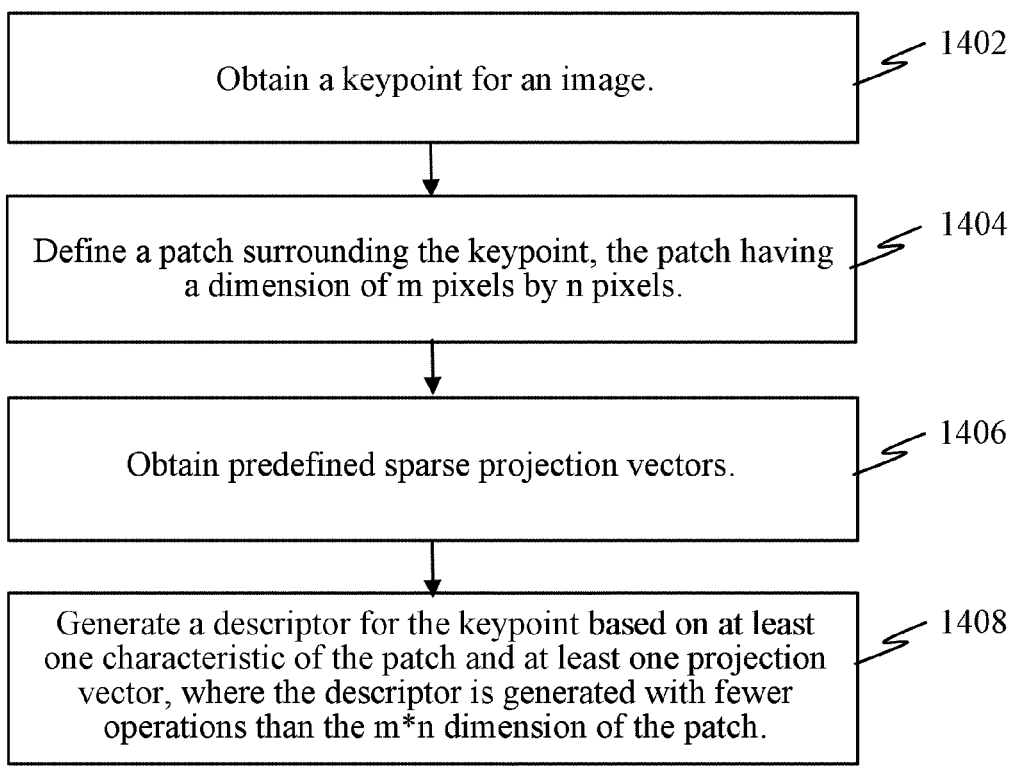
FIG. 14 illustrates a method for generating feature descriptors with fewer operations than the dimensions of a patch that characterizes the feature.

FIG. 14 illustrates a method for generating feature descriptors with fewer operations than the dimensions of a patch that characterizes the feature. A keypoint may be obtained for an image 1402. Such keypoint may obtained from a scale space (e.g., Gaussian scale space) obtained for the image. The keypoint may be a local minima or maxima at a particular image scale within a region of the image. A patch may be defined surrounding the keypoint, the patch having a dimension of m pixels by n pixels 1404. Predefined sparse projection vectors are also obtained 1406. For example, the sparse projection vectors may be part of a sparse coefficient matrix and may be constrained to the scales of a smoothening kernel for the image. The sparse projection vectors are independent of the image. For example, the projection vectors may be generated based on a training set of images that exclude the image. A descriptor for the keypoint may then be generated based on at least one characteristic of the patch and at least one sparse projection vector, where the descriptor is generated with fewer operations than the m*n dimension of the patch 1408.

Exemplary Sparse PCA-SIFT Implementation

FIG. 15 illustrates various views for the same test image, from which the accuracy of a descriptor generated using a spare PCA-SIFT algorithm may be tested. These images 1502, 1506, and 1508 may be used to compare the sparse PCA-SIFT algorithm disclosed herein to the SIFT and PCA-SIFT algorithms in terms of their matching accuracy and computational complexity. The matching accuracy is evaluated using recall-precision curves. These plots (FIG. 16) are obtained for two images of a planar scene with a known homography between them. A descriptor $x^1$ in a first image is matched to a descriptor $x^2$ in a second image, if $x^2$ is the nearest neighbor of $x^1$ in feature space and the ratio of the distance to nearest neighbor and the distance to the second nearest neighbor is below a threshold t. This ratio test is used to avoid matching of non-distinctive descriptors. The recall rate for a specified threshold is given by the ratio of the true matches to the number of all possible correspondences between the first and second images, i.e. recall=#true matches/#correspondences. Precision specifies how precise the matching procedure is by calculating the ratio of true matches to total number of matches, i.e. precision=#true matches/#matches. As the threshold t is varied, the recall-precision curves are obtained.

Figure 16:
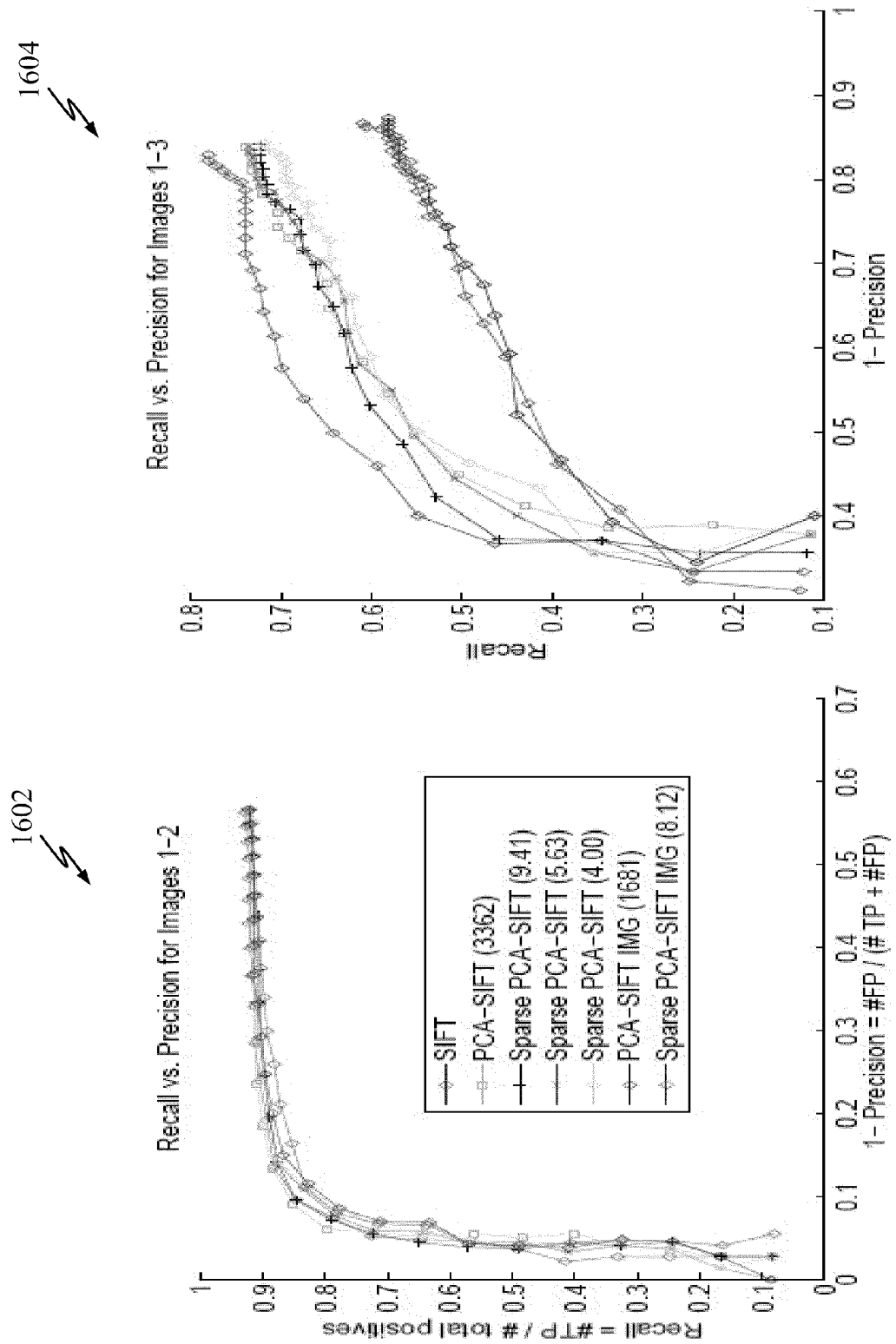
FIG. 16 illustrates an example of the matching accuracy of the descriptors using SIFT, PCA-SIFT and Sparse PCA-SIFT, which are all obtained using the gradient levels in x and y directions.

FIG. 16 illustrates an example of the matching accuracy of the descriptors using SIFT, PCA-SIFT and Sparse PCA-SIFT, which are all obtained using the gradient levels in x and y directions. Hence, PCA-SIFT and sparse PCA-SIFT are using 2×39×39 normalized gradient patches. In this example, the standard deviation of the smoothing kernel is selected as $\sigma=\sqrt{(2^{2/S})^2-(2^{0/S})^2}=1.2328$ and $S=3$.

To project a patch (obtained in a scale level l) to the sparse PCA subspace, the coefficient is multiplied with the corresponding pixels at two scales up (scale level l+2). As seen in the recall-precision curves, while PCA-SIFT performs very well for image pair 1-2 (graph 1602), it performs poorly when the viewpoint change is larger as it is in pair 1-3 (graph 1604). This is because PCA is sensitive to small registration errors. Sparse PCA-SIFT solves this problem by representing the basis vectors using Gaussian basis functions. Hence, it performs better than PCA-SIFT for image pair 1-3. Overall, sparse PCA-SIFT and SIFT are comparable, the former performing better when the viewpoint change is small. The main advantage of sparse PCA-SIFT is its low computational complexity, which consists of, on average, multiplications with a few non-zero coefficients.

FIG. 17 is a table illustrating the comparative computational complexity of SIFT, PCA-SIFT and Sparse PCA-SIFT algorithms. The complexity of descriptor computation for SIFT and other histogram based approaches depends on the scale level a of the detected keypoint. In one example, SIFT opens a $12\sigma \times 12\sigma$ patch around the detected keypoint location, where σ is equal to the scale level within the octave of the Gaussian scale-space for the image. This patch is pooled to a 4×4 cell, where an orientation histogram quantized to 8 angles is obtained for each cell. Tri-linear interpolation for each cell (weighted sums of 2 closest cells in the scale-space with $3\sigma \pm 1.5\sigma = 6\sigma$ pixels width square in the image domain) results in $16 \times 2 \times (6\sigma)^2$ multiplication and addition operations. When the standard scaling σ=1.6 this is equal to 2949 operations per descriptor and for the highest level within an octave σ=3.2 it is 11796 operations per descriptor.

For PCA-SIFT the horizontal and vertical gradients of 39×39 pixels patches may be used around the detected keypoints. PCA-SIFT projects the patches to a 50-dimensional subspace by using all of the $2 \times 39^2 = 3042$-dimensions. Hence, it requires $50 \times 3042 = 152100$ multiplication and addition operations per patch to generate a descriptor.

On the other hand, for Sparse PCA-SIFT limited the number of non-zero elements of the coefficient vectors. The complexity of the PCA-SIFT algorithm is proportional to average non-zero coefficients per projection vector s={4, 5.63, 9.41} that is used to project the patches to 200-dimensional subspace. This requires between $4 \times 200 = 800$ to $9.41 \times 200 = 1882$ multiplication and addition operations per patch. Hence, the described Sparse PCA-SIFT algorithm performs much faster than histogram-based descriptors such as SIFT and pixel-based descriptors such as PCA-SIFT.

Exemplary Image Matching Device

Figure 18:
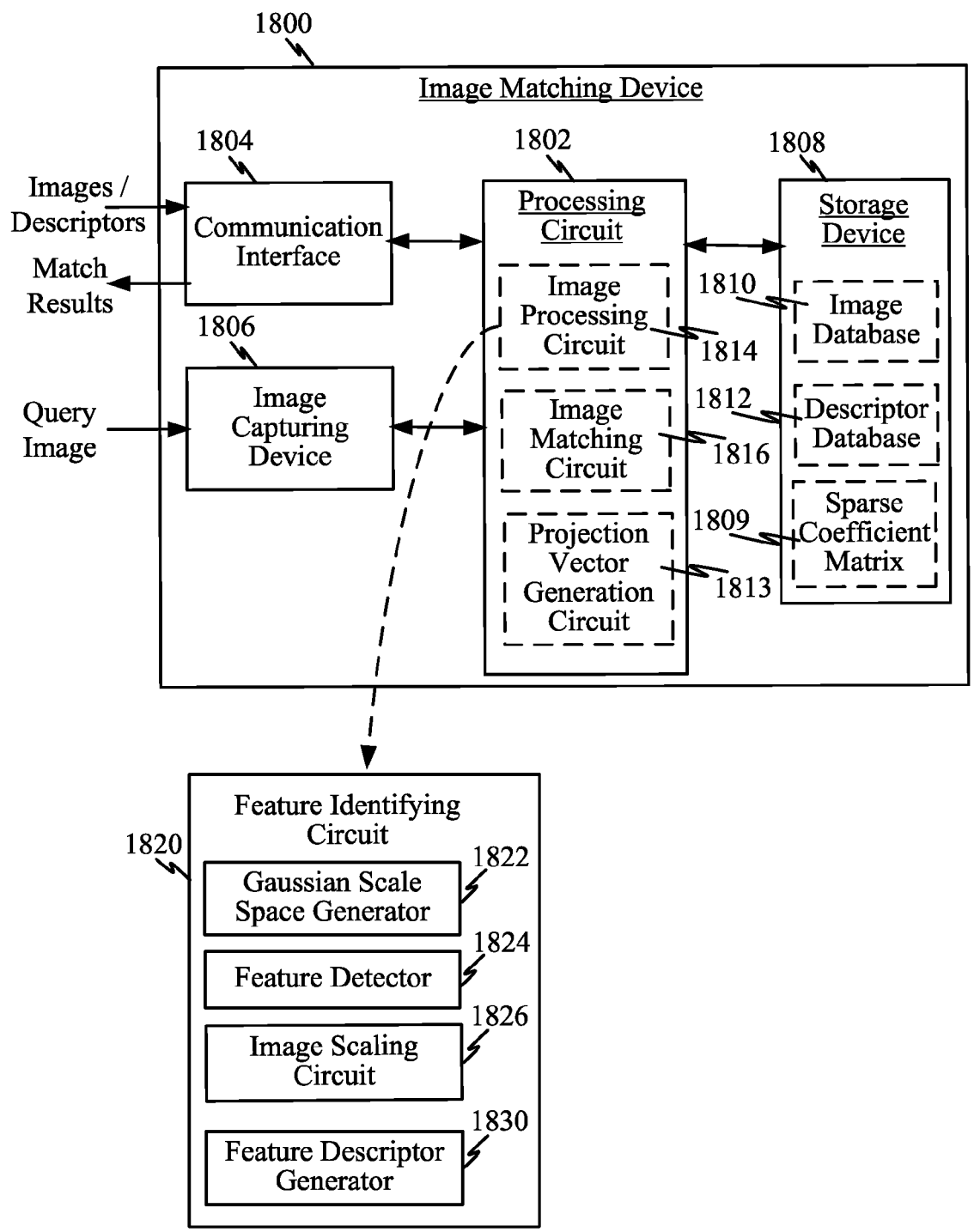
FIG. 18 is a block diagram illustrating an example of an image matching device the may generate keypoint descriptors using sparse projection vectors.

FIG. 18 is a block diagram illustrating an example of an image matching device the may generate keypoint descriptors using sparse projection vectors. The image matching device 1800 may include a processing circuit 1802, coupled to a communication interface 1804, an image capturing device 1806, and/or a storage device 1808. The communication interface 1804 may be adapted to communicate over a wired/wireless network and receive images and/or feature descriptors for one or more images. The image capturing device 1806 may be, for example, a digital camera that can capture a query image. The processing circuit 1802 may include an image processing circuit 1814 to extract features from images and an image matching circuit 1816 that uses the extracted features to match a query image to a database of target images 1810 and/or query image descriptors to a descriptor database 1812. The processing circuit may also include or implement a projection vector generation circuit 1813 that generates a sparse coefficient matrix 1809 of sparse projection vectors. Examples of how the sparse projection vectors are generated and used are illustrated in FIGS. 1, 6, 7, 8, 10, 12, 13, and 14.

The image matching device 1800 may implement one or more features and/or methods described in those figures.

According to one exemplary implementation, an image matching application attempts to match a query image to one or more images in an image database. The image database may include millions of feature descriptors associated with the one or more images stored in the database 1810.

The image processing circuit 1814 may include a feature identifying circuit 1820 that includes a Gaussian scale space generator 1822, a feature detector 1824, an image scaling circuit 1826, and/or a feature descriptor extractor 1830. The Gaussian scale space generator 1822 may serve to convolve an image with a blurring function to generate a plurality of different scale spaces as illustrated, for example, in FIG. 2. The feature detector 1824 may then identify one or more keypoints in the different scale spaces for the image (e.g., by using local maxima and minima as illustrated in FIG. 3). The image scaling circuit 1826 may serve to approximate the scale of an image in order to select an appropriate kernel size at which to perform feature detection and/or clustering. The feature descriptor generator 1830 generates a descriptor for each keypoint and/or its surrounding patch by using the sparse projection vectors stored in the sparse coefficient matrix 1809.

Note that, in some implementations, a set of feature descriptors associated with keypoints for a query image may be received by the image matching device. In this situation, the query image has already been processed (to obtain the descriptors). Therefore, the image processing circuit 1814 may be bypassed or removed from the image matching device 1800.

Exemplary Mobile Device

Figure 19:
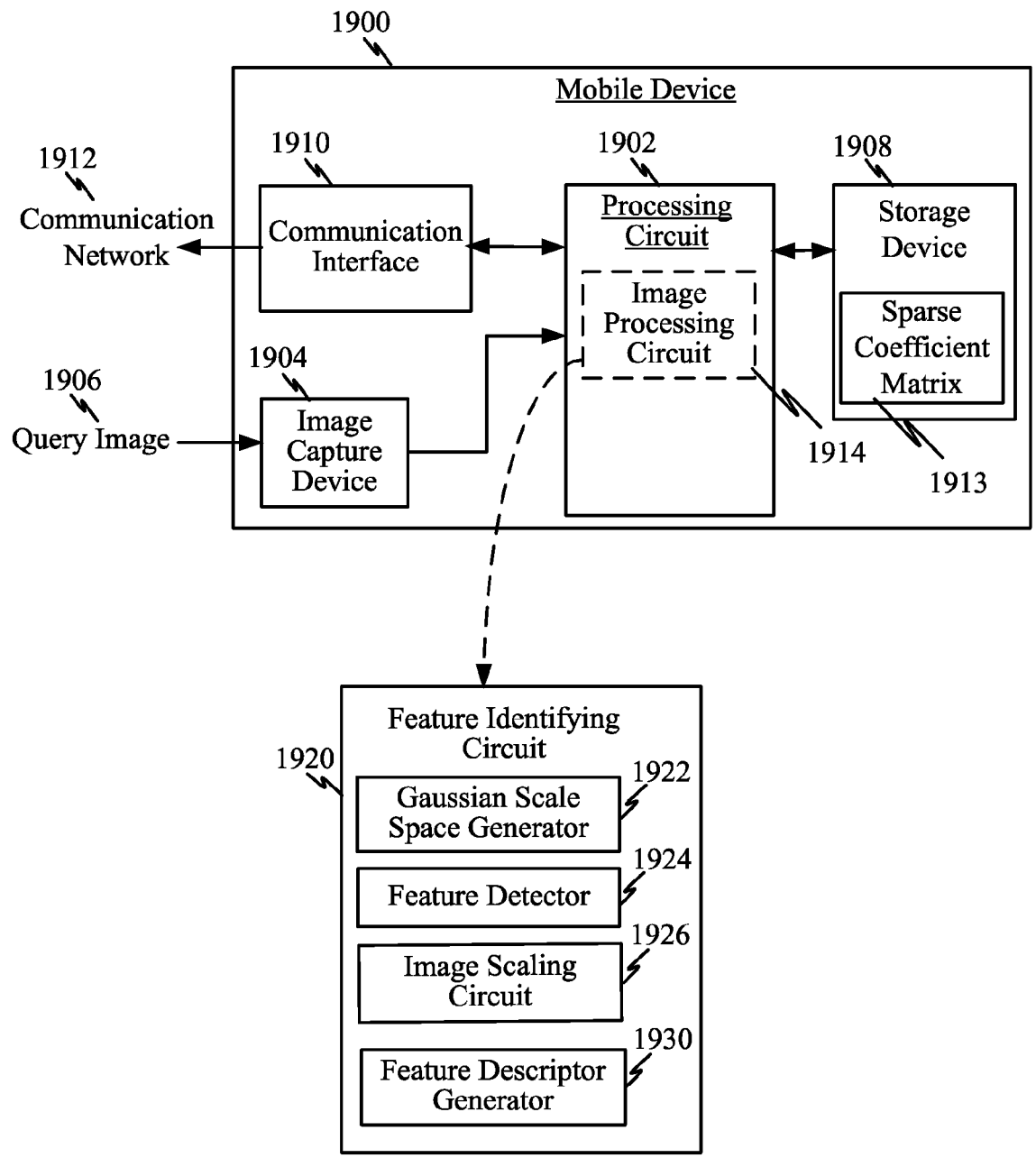
FIG. 19 is a block diagram illustrating an exemplary mobile device adapted to perform image processing for purposes of image or object recognition.

FIG. 19 is a block diagram illustrating an exemplary mobile device adapted to perform image processing for purposes of image or object recognition. The mobile device 2200 may include a processing circuit 1902 coupled to an image capture device 1904, a communication interface 1910 and a storage device 1908. The image capture device 1904 (e.g., digital camera) may be adapted to capture a query image 1906 of interest and provides it to the processing circuit 1902. The storage device 1908 may include a sparse coefficient matrix 1913 defining a plurality of sparse projection vectors. The sparse coefficient matrix 1913 may be pre-generated (either on the mobile device or at a different device) based on a set of training images.

The processing circuit 1902 may be adapted to process the captured image to generate feature descriptors that can be subsequently transmitted or used for image/object recognition. For example, the processing circuit 1902 may include or implement a feature identifying circuit 1920 that includes a Gaussian scale space generator 1922, a feature detector 1924, an image scaling circuit 1926, and/or a feature descriptor extractor 1930. The Gaussian scale space generator 1922 may serve to convolve an image with a blurring function to generate a plurality of different scale spaces as illustrated, for example, in FIG. 2. The feature detector 1924 may then identify one or more keypoints in the different scale spaces for the image (e.g., by using local maxima and minima as illustrated in FIGS. 3 and 6A). The image scaling circuit 1926 may serve to approximate the scale of an image in order to select an appropriate kernel size at which to perform feature detection and/or clustering. The feature descriptor generator 1930 generates a descriptor for each keypoint and/or its surrounding patch (e.g., illustrated in FIGS. 6B and 10) by using projection vectors from the sparse coefficient matrix 1913. Examples of how the sparse projection vectors are generated and used to generate keypoint descriptors are illustrated in FIGS. 1, 6, 7, 8, 10, 12, 13, and 14. The mobile device 1900 may implement one or more features and/or methods described in those figures.

The processing circuit 1902 may then store the one or more feature descriptors in the storage device 1908 and/or may also transmit the feature descriptors over the communication interface 1910 (e.g., a wireless communication interface, transceiver, or circuit) through a communication network 1912 to an image matching server that uses the feature descriptors to identify an image or object therein. That is, the image matching server may compare the feature descriptors to its own database of feature descriptors to determine if any image in its database has the same feature(s).

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in a figure may be configured to perform one or more of the methods, features, or steps described in another figure. The algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for generating a feature descriptor, comprising:
  obtaining a set of pre-generated sparse projection vectors over a first plurality of scale levels;
  obtaining a scale space for an image, the scale space having a second plurality scale levels; and
  generating a descriptor for a keypoint in the scale space based on a combination of the sparse projection vectors and sparsely sampled pixel information for a plurality of pixels across the second plurality of scale levels.

2. The method of claim 1, wherein the sparse projection vectors are generated independent of the image.

3. The method of claim 1, where each sparse projection vector is constrained to scales of a smoothening kernel for the image.

4. The method of claim 1, wherein each of the sparse projection vectors maximize or minimize an objective function.

5. The method of claim 4, wherein the objective function is maximization of an autocorrelation matrix for pixel information across the first plurality of scale levels for a training set of images.

6. The method of claim 1, wherein a sparse projection vector includes a majority of zero elements and a plurality of non-zero elements.

7. The method of claim 6, wherein the non-zero elements are obtained by a variance maximization procedure.

8. The method of claim 1, wherein the pixel information includes gradient information for each pixel within a patch associated the keypoint.

9. The method of claim 1, wherein the plurality of pixels are associated with a patch for the keypoint.

10. The method of claim 1, wherein the plurality of pixels are selected at pre-determined locations corresponding to non-zero coefficients for the sparse projection vectors.

11. The method of claim 1, further comprising:
obtaining a keypoint from the scale space for the image; and
obtaining a patch for the keypoint, where the patch includes the plurality of pixels.

12. The method of claim 11, wherein the plurality of sparse projection vectors define a set of non-zero scaling coefficients, each non-zero scaling coefficient being associated with a corresponding pixel location within the patch.

13. The method of claim 12, wherein the descriptor is generated by combining a plurality of descriptor components, each descriptor component generated by:
identifying pixel locations based on the non-zero scaling coefficient locations for a first sparse projection vector;
multiplying a value of the pixel location from the patch with the corresponding non-zero scaling coefficient for the first sparse projection vector and add the resulting values together to obtain a first descriptor component.

14. The method of claim 13, further comprising:
obtaining additional descriptor components for the remaining plurality of sparse projection vectors to obtain additional descriptor components, wherein the first descriptor component and additional descriptor components are combined as a vector to obtain the keypoint descriptor.

15. The method of claim 9, wherein the patch has a dimension of m pixels by n pixels and is projected over the second plurality of scale levels s, then the keypoint descriptor is generated with fewer operations than the m*n*s dimensions of the patch.

16. A device, comprising:
a storage device for storing a set of pre-generated sparse projection vectors over a first plurality of scale levels; and
a processing circuit coupled to the storage device, the processing circuit adapted to:
obtain a scale space for an image, the scale space having a second plurality scale levels; and
generate a descriptor for a keypoint in the scale space based on a combination of the sparse projection vectors and sparsely sampled pixel information for a plurality of pixels across the second plurality of scale levels.

17. The device of claim 16, wherein the sparse projection vectors are generated independent of the image.

18. The device of claim 16, where each sparse projection vector is constrained to scales of a smoothening kernel for the image.

19. The device of claim 16, wherein each of the sparse projection vectors maximize or minimize an objective function.

20. The device of claim 19, wherein the objective function is maximization of an autocorrelation matrix for pixel information across the first plurality of scale levels for a training set of images.

21. The device of claim 16, wherein a sparse projection vector includes a majority of zero elements and a plurality of non-zero elements.

22. The device of claim 21, wherein the non-zero elements are obtained by a variance maximization procedure.

23. The device of claim 16, wherein the pixel information includes gradient information for each pixel within a patch associated the keypoint.

24. The device of claim 16, wherein the plurality of pixels are associated with a patch for the keypoint.

25. The device of claim 16, wherein the plurality of pixels are selected at pre-determined locations corresponding to non-zero coefficients for the sparse projection vectors.

26. The device of claim 16, wherein the processing circuit is further adapted to:
obtain a keypoint from the scale space for the image; and
obtain a patch for the keypoint, where the patch includes the plurality of pixels.

27. The device of claim 26, wherein the plurality of sparse projection vectors define a set of non-zero scaling coefficients, each non-zero scaling coefficient being associated with a corresponding pixel location within the patch.

28. The device of claim 27, wherein the descriptor is generated by combining a plurality of descriptor components, each descriptor component generated by:
identifying pixel locations based on the non-zero scaling coefficient locations for a first sparse projection vector;
multiplying a value of the pixel location from the patch with the corresponding non-zero scaling coefficient for the first sparse projection vector and add the resulting values together to obtain a first descriptor component.

29. The device of claim 28, wherein the processing circuit is further adapted to:
obtain additional descriptor components for the remaining plurality of sparse projection vectors to obtain additional descriptor components, wherein the first descriptor component and additional descriptor components are combined as a vector to obtain the keypoint descriptor.

30. The device of claim 24, wherein the patch has a dimension of m pixels by n pixels and is projected over the second plurality of scale levels s, then the keypoint descriptor is generated with fewer operations than the m*n*s dimensions of the patch.

31. A device, comprising:
means for obtaining a set of pre-generated sparse projection vectors over a first plurality of scale levels;
means for obtaining a scale space for an image, the scale space having a second plurality scale levels; and
means for generating a descriptor for a keypoint in the scale space based on a combination of the sparse projection vectors and sparsely sampled pixel information for a plurality of pixels across the second plurality of scale levels.

32. The device of claim 31, wherein the sparse projection vectors are generated independent of the image.

33. The device of claim 31, where each sparse projection vector is constrained to scales of a smoothening kernel for the image.

34. The device of claim 31, wherein each of the sparse projection vectors maximize or minimize an objective function.

35. The device of claim 34, wherein the objective function is maximization of an autocor.

36. The device of claim 31, wherein a sparse projection vector includes a majority of zero elements and a plurality of non-zero elements.

37. The device of claim 36, wherein the non-zero elements are obtained by a variance maximization procedure.

38. The device of claim 31, wherein the pixel information includes gradient information for each pixel within a patch associated the keypoint.

39. The device of claim 31, wherein the plurality of pixels are associated with a patch for the keypoint.

40. The device of claim 31, wherein the plurality of pixels are selected at pre-determined locations corresponding to non-zero coefficients for the sparse projection vectors.

41. The device of claim 31, further comprising:
means for obtaining a keypoint from the scale space for the image; and
means for obtaining a patch for the keypoint, where the patch includes the plurality of pixels.

42. The device of claim 41, wherein the plurality of sparse projection vectors define a set of non-zero scaling coefficients, each non-zero scaling coefficient being associated with a corresponding pixel location within the patch.

43. The device of claim 42, wherein the descriptor is generated by combining a plurality of descriptor components, each descriptor component generated by:
means for identifying pixel locations based on the non-zero scaling coefficient locations for a first sparse projection vector;
means for multiplying a value of the pixel location from the patch with the corresponding non-zero scaling coefficient for the first sparse projection vector and add the resulting values together to obtain a first descriptor component.

44. The device of claim 43, further comprising:
means for obtaining additional descriptor components for the remaining plurality of sparse projection vectors to obtain additional descriptor components, wherein the first descriptor component and additional descriptor components are combined as a vector to obtain the keypoint descriptor.

45. The device of claim 39, wherein the patch has a dimension of m pixels by n pixels and is projected over the second plurality of scale levels s, then the keypoint descriptor is generated with fewer operations than the m*n*s dimensions of the patch.

46. A non-transitory processor-readable storage medium comprising one or more instructions operational on a device, which when executed by a processing circuit, causes the processing circuit to:
obtain a set of pre-generated sparse projection vectors over a first plurality of scale spaces;
obtain a scale space for an image, the scale space having a second plurality scale levels; and
generate a descriptor for a keypoint in the scale space based on a combination of the sparse projection vectors and sparsely sampled pixel information for a plurality of pixels across the second plurality of scale levels.

47. The non-transitory processor-readable storage medium of claim 46, wherein the sparse projection vectors are generated independent of the image.

48. The non-transitory processor-readable storage medium of claim 46, where each sparse projection vector is constrained to scales of a smoothening kernel for the image.

49. The non-transitory processor-readable storage medium of claim 46, wherein each of the sparse projection vectors maximize or minimize an objective function.

50. The non-transitory processor-readable storage medium of claim 49, wherein the objective function is maximization of an autocorrelation matrix for pixel information across the first plurality of scale levels for a training set of images.

51. The non-transitory processor-readable storage medium of claim 46, wherein a sparse projection vector includes a majority of zero elements and a plurality of non-zero elements.

52. The non-transitory processor-readable storage medium of claim 51, wherein the non-zero elements are obtained by a variance maximization procedure.

53. The non-transitory processor-readable storage medium of claim 46, wherein the pixel information includes gradient information for each pixel within a patch associated the keypoint.

54. The non-transitory processor-readable storage medium of claim 46, wherein the plurality of pixels are associated with a patch for the keypoint.

55. The non-transitory processor-readable storage medium of claim 46, wherein the plurality of pixels are selected at pre-determined locations corresponding to non-zero coefficients for the sparse projection vectors.

56. The non-transitory processor-readable storage medium of claim 46, further comprising one or more instructions which when executed by the processing circuit, causes the processing circuit to:
obtain a keypoint from the scale space for the image; and
obtain a patch for the keypoint, where the patch includes the plurality of pixels.

57. The non-transitory processor-readable storage medium of claim 46, wherein the plurality of sparse projection vectors define a set of non-zero scaling coefficients, each non-zero scaling coefficient being associated with a corresponding pixel location within the patch.

58. The non-transitory processor-readable storage medium of claim 57, wherein the descriptor is generated by combining a plurality of descriptor components, each descriptor component generated by:
identifying pixel locations based on the non-zero scaling coefficient locations for a first sparse projection vector;
multiplying a value of the pixel location from the patch with the corresponding non-zero scaling coefficient for the first sparse projection vector and add the resulting values together to obtain a first descriptor component.

59. The non-transitory processor-readable storage medium of claim 58, further comprising one or more instructions which when executed by the processing circuit, causes the processing circuit to:
obtain additional descriptor components for the remaining plurality of sparse projection vectors to obtain additional descriptor components, wherein the first descriptor component and additional descriptor components are combined as a vector to obtain the keypoint descriptor.

60. The non-transitory processor-readable storage medium of claim 54, wherein the patch has a dimension of m pixels by n pixels and is projected over the second plurality of scale levels s, then the keypoint descriptor is generated with fewer operations than the m*n*s dimensions of the patch.

61. The method of claim 1, wherein the scale space is a differential scale space.

* * * * *